United States Patent
Wang et al.

(10) Patent No.: US 9,574,138 B2
(45) Date of Patent: *Feb. 21, 2017

(54) PROCESS FOR MAKING SATURATED HYDROCARBONS FROM RENEWABLE FEEDS

(71) Applicant: ExxonMobil Research and Engineering Company, Annandale, NJ (US)

(72) Inventors: Kun Wang, Bridgewater, NJ (US); Virginia M. Roberts, Weehawken, NJ (US); Paul D. Oldenburg, Cypress, TX (US); Suzzy Chen Hsi Ho, Princeton, NJ (US); Michel Daage, Hellertown, PA (US); Frank Cheng-Yu Wang, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 185 days.

This patent is subject to a terminal disclaimer.

(21) Appl. No.: 14/096,277

(22) Filed: Dec. 4, 2013

(65) Prior Publication Data

US 2014/0171699 A1    Jun. 19, 2014

Related U.S. Application Data

(60) Provisional application No. 61/738,482, filed on Dec. 18, 2012.

(51) Int. Cl.
*C10G 3/00* (2006.01)
*C10M 105/04* (2006.01)

(52) U.S. Cl.
CPC . *C10G 3/50* (2013.01); *C10G 3/44* (2013.01); *C10M 105/04* (2013.01); *Y02E 50/13* (2013.01); *Y02P 30/20* (2015.11)

(58) Field of Classification Search
CPC .......... C10G 3/50; C10G 3/44; C10M 105/04; Y02E 50/13

(Continued)

(56) References Cited

U.S. PATENT DOCUMENTS 3,962,135 A * 6/1976 Alafandi .................. B01J 20/12
502/84
4,986,894 A * 1/1991 Keville .................... B01J 29/04
208/111.1

(Continued)

FOREIGN PATENT DOCUMENTS

GB         347543 A     4/1931
WO    2007068799 A2    6/2007

(Continued)

OTHER PUBLICATIONS

The International Search Report and Written Opinion of PCT/US2013/073008 dated Jan. 20, 2015.

(Continued)

*Primary Examiner* — In Suk Bullock
*Assistant Examiner* — Aaron Pierpont
(74) *Attorney, Agent, or Firm* — Robert A. Migliorini

(57) ABSTRACT

Provided are processes for making saturated hydrocarbons from renewable feed sources. In an embodiment, a process for producing a lube basestock and/or a diesel fuel from a feedstock of biological origin includes: contacting the feedstock in a single reactor in the presence of hydrogen with catalyst components including a first catalyst and a second catalyst, wherein the first catalyst comprises an acidic material, a basic material, or a combination of both, and wherein the second catalyst is a hydrogenation catalyst including a hydrothermally stable binder.

28 Claims, 15 Drawing Sheets

(58) Field of Classification Search
USPC .................................................. 585/17, 254
See application file for complete search history.

(56) References Cited

U.S. PATENT DOCUMENTS

| | | | |
|---|---|---|---|
| 6,569,313 B1* | 5/2003 | Carroll | C10G 65/12 208/108 |
| 6,632,765 B1* | 10/2003 | Chen | B01J 23/92 502/53 |
| 7,815,694 B2 | 10/2010 | Miller | |
| 7,850,841 B2 | 12/2010 | Koivusalmi et al. | |
| 7,888,542 B2 | 2/2011 | Koivusalmi et al. | |
| 7,960,596 B2 | 6/2011 | Miller | |
| 8,124,572 B2 | 2/2012 | Miller | |
| 8,187,344 B2 | 5/2012 | Jakkula et al. | |
| 2006/0207166 A1 | 9/2006 | Herskowitz et al. | |
| 2007/0100166 A1* | 5/2007 | Beavers | B01J 23/02 568/397 |
| 2007/0131579 A1 | 6/2007 | Koivusalmi et al. | |
| 2007/0135663 A1 | 6/2007 | Aalto et al. | |
| 2007/0135669 A1 | 6/2007 | Koivusalmi et al. | |
| 2007/0161832 A1 | 7/2007 | Myllyoja et al. | |
| 2008/0302001 A1* | 12/2008 | Koivusalmi | C10G 45/62 44/308 |
| 2009/0014354 A1 | 1/2009 | Knuuttila et al. | |
| 2009/0158637 A1 | 6/2009 | McCall et al. | |
| 2009/0162264 A1 | 6/2009 | McCall et al. | |
| 2009/0253947 A1 | 10/2009 | Brandvold et al. | |
| 2009/0283442 A1 | 11/2009 | McCall et al. | |
| 2009/0299109 A1 | 12/2009 | Gruber et al. | |
| 2010/0018108 A1 | 1/2010 | Miller | |
| 2010/0081809 A1 | 4/2010 | Devarakonda et al. | |
| 2010/0234654 A1* | 9/2010 | Wang | C07C 29/149 585/254 |
| 2011/0107656 A1 | 5/2011 | Miller | |
| 2011/0301387 A1* | 12/2011 | Wang | C07C 37/08 568/798 |
| 2012/0102827 A1 | 5/2012 | Miller | |
| 2012/0102828 A1 | 5/2012 | Miller | |
| 2012/0108869 A1 | 5/2012 | Miller et al. | |
| 2012/0108870 A1 | 5/2012 | Miller | |
| 2012/0108871 A1 | 5/2012 | Miller | |
| 2012/0216450 A1 | 8/2012 | Dupassieux et al. | |
| 2012/0260565 A1* | 10/2012 | Nousiainen | C10G 3/46 44/388 |
| 2012/0316093 A1 | 12/2012 | Zhan et al. | |

FOREIGN PATENT DOCUMENTS

| | | | |
|---|---|---|---|
| WO | 2007068800 | 6/2007 | |
| WO | 2010104580 A1 | 9/2010 | |
| WO | 2011112661 A2 | 9/2011 | |
| WO | WO 2012162403 A1 * | 11/2012 | C10G 3/42 |
| WO | 2013113976 A1 | 8/2013 | |

OTHER PUBLICATIONS

Bernal, S. et al, "Reversibility of Hydrogen Chemisorption on a Ceria-Supported Rhodium Catalyst," Journal of Catalysis, 1992, vol. 137, pp. 1-11.

* cited by examiner

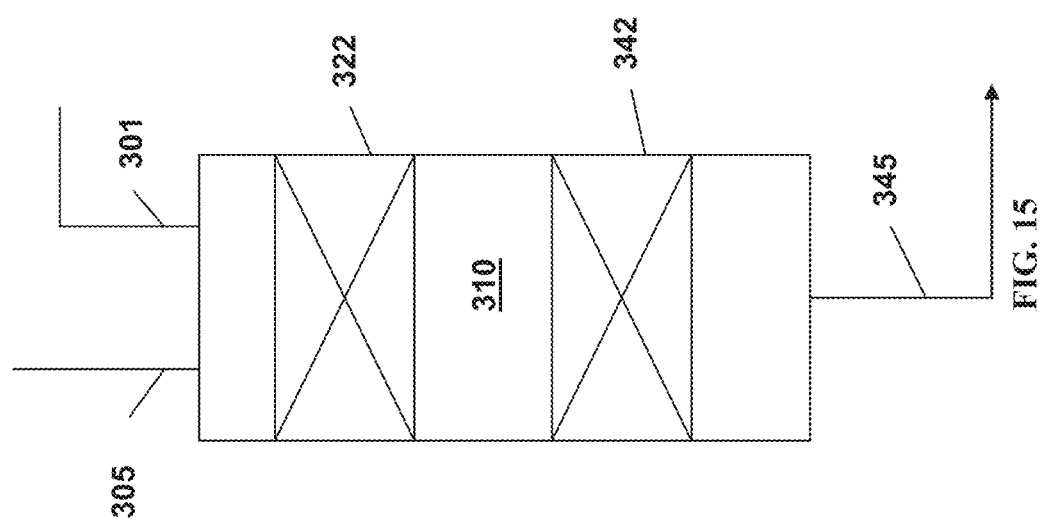

PROCESS FOR MAKING SATURATED HYDROCARBONS FROM RENEWABLE FEEDS

CROSS-REFERENCE TO RELATED APPLICATIONS

This application claims priority to U.S. Provisional Application Ser. No. 61/738,482 filed Dec. 18, 2012, herein incorporated by reference in its entirety.

FIELD

The present disclosure relates to improved methods for making saturated hydrocarbons from renewable feed sources and hydrocarbon products prepared by the methods. More particularly, this disclosure is directed to one-step conversion of a feedstock of biological origin to lube basestocks and/or diesel fuel.

BACKGROUND

Lube basestocks are commonly used for the production of lubricants, such as lubricating oils for automobiles, industrial lubricants and lubricating greases. They are also used as process oils, white oils, metal working oils and heat transfer fluids. Finished lubricants consist of two general components, lubricating base oil and additives. Lubricating base oil is the major constituent in these finished lubricants and contributes significantly to the properties of the finished lubricant. In general, a few lubricating base oils are used to manufacture a wide variety of finished lubricants by varying the mixtures of individual lubricating base oils and individual additives.

According to the American Petroleum Institute (API) classifications, lube basestocks are categorized in five groups based on their saturated hydrocarbon content, sulfur level, and viscosity index (Table 1). Lube base oils are typically produced in large scale from non-renewable petroleum sources. Group I, II, and III basestocks are all derived from crude oil via extensive processing, such as solvent extraction, solvent or catalytic dewaxing, and hydroisomerization. Group III base oils can also be produced from synthetic hydrocarbon liquids obtained from natural gas, coal or other fossil resources. Group IV basestocks, the poly (alpha olefins) (PAO), are produced by oligomerization of alpha olefins, such as 1-decene. Group V base oils include everything that does not belong to Groups I-IV, such as naphthenics, polyalkylene glycols (PAG) and esters.

TABLE 1

| | API Classification | | | | |
|---|---|---|---|---|---|
| | Group I | Group II | Group III | Group IV | Group V |
| % Saturates | <90 | ≥90 | ≥90 | Poly alpha-olefins (PAO) | All others not belonging to Group I-IV |
| % S | >0.03 | ≤0.03 | ≤0.03 | | |
| Viscosity Index (VI) | 80-120 | 80-120 | ≥120 | | |

Natural oils derived from biological sources are sometimes used as lubricants, but to a small scale, due to their poor low-temperature properties and hydrolysis instability. The triglyceride esters in natural oils are often hydrolyzed to yield fatty acids, which can be subsequently converted into esters as synthetic lubricants.

For environmental, economical, and regulatory reasons, it is of interest to produce fuels, chemicals, and lube oils from renewable sources of biological origin. So far only esters of renewable and biological origin have been used in applications such as refrigeration compressor lubricants, bio-hydraulic oils and metal working oils. In automotive and industrial lubricants, esters from biological sources are used in very small fractions as additives due to technical problems as well as their high prices. For example, ester base oils can hydrolyze readily producing acids, which in turn cause corrosion on lubricating systems.

In contrast, lube basestocks consisting of hydrocarbons from biological sources do not have those technical problems associated with esters from same sources. Most common biological sources for hydrocarbons are natural oils, which can be derived from plant sources such as canola oil, castor oil, sunflower seed oil, rapeseed oil, peanut oil, soy bean oil, and tall oil, or derived from animal fats. The basic structural unit of natural oils and fats is a triglyceride, which is an ester of glycerol with three fatty acid molecules having the structure below:

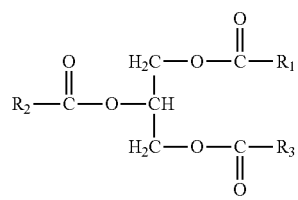

wherein $R_1$, $R_2$, and $R_3$ represent $C_4$-$C_{30}$ hydrocarbon chains. Fatty acids are carboxylic acids containing long linear hydrocarbon chains. Lengths of the hydrocarbon chains most commonly are 18 carbons ($C_{18}$). $C_{18}$ fatty acids are typically bonded to the middle hydroxyl group of glycerol. Typical carbon numbers of the fatty acids linked to the two other hydroxyl groups are even numbers, being between $C_{14}$ and $C_{22}$.

For the purpose of this disclosure, when all the fatty acid chains in a triglyceride have more than 14 carbon atoms, the triglyceride is considered a long-chain fatty acid triglyceride. When one or more of the fatty acid chains in a triglyceride has less than 14 carbon atoms, the triglycerides are considered medium-chain triglycerides.

In the field of fuels, so-called renewable source components are now required both in the US and Europe. Although there is no imminent requirement for lube products currently, generating premium basestocks from renewable sources on a large scale is attractive for the same policy reasons that led to the imposition of regulations in the higher volume fuel area. In fact, with recent advances in biofuels, natural oils are becoming increasingly available as feedstocks that provide fuel value comparable to that of petroleum oils. Converting these bio-feeds to lubes can give significant value uplift.

WO 2007/068800 describes a process for producing a saturated hydrocarbon component from a biological starting material comprising an oligomerization step, an optional prehydrogenation step, a deoxygenation step and an optional hydroisomerization step.

US 2009/0014354 mentions a process for producing base oils from a biological starting material comprising a condensation step selected from ketonization, aldol condensation, alcohol condensation and radical reaction and a combined hydrodefunctionalization and isomerization step under pressure from 0.1 to 15 MPa at the temperature from 100 to 500° C. in the presence of a bifunctional catalyst.

Recent researches focus on chemical transformations in a series of catalytic steps requiring separate reactors for each individual step as well as optimization of conditions in each reactor. Many process steps involve clean-up of a reaction mixture or isolation of a desired product from a mixture. For example, fatty acids and alcohols are produced by hydrolysis of fatty acid triglycerides. Hydrolysis is typically conducted by treating the triglyceride with an acid solution, and is sometimes followed by extraction with an organic solvent, and finally recovery of the organic solvent. The acid is consumed in the process and therefore, hydrolysis can add significant cost to the lube processes disclosed in the art.

US 2010/0018108 describes a method for producing base oil and diesel or other transportation fuel comprising processing a triglyceride-containing vegetable oil to effect oligomerization and deoxygenation of unsaturated fatty acid components contained therein to provide for an oligomerized mixture, isomerizing the oligomerized mixture over an isomerization catalyst to yield an isomerized mixture, and distilling the isomerized mixture to produce a base oil and a diesel fuel.

SUMMARY

The present disclosure relates to a process for producing a lube base stock and a diesel fuel directly from a feedstock derived from natural oil. There is provided a process for producing a lube basestock and/or a diesel fuel from a feedstock of biological origin, the method comprising: contacting the feedstock in a single reactor in the presence of hydrogen with catalyst components comprising a first catalyst and a second catalyst, wherein the first catalyst comprises an acidic material, a basic material, or a combination of both, and wherein the second catalyst comprises a hydrogenation catalyst and a hydrothermally stable binder. The feedstock normally contains glycerides including triglycerides and/or lipids such as phospholipids or saccharolipids, and can further contain fatty acids, fatty acid esters, fatty alcohols, fatty olefins, mono-glycerides, and di-glycerides. The process involves conversion of a starting material containing ester bonds to a saturated hydrocarbon mixture containing a significant fraction of saturated hydrocarbons in the $C_{20}$ and higher range suitable for use as lube basestocks and diesel fuel.

In an embodiment, the method involves contacting the feedstock with a basic catalyst and a hydrogenation catalyst in a single reactor under hydrogen pressure. In this embodiment, the hydrogenation catalyst also promotes dewaxing of the relatively unbranched hydrocarbon produced by the action of the basic catalyst on the glyceride- or fatty acid-containing feedstock.

Alternatively, the method involves contacting the feedstock with an acidic catalyst and a hydrogenation catalyst in a single reactor under hydrogen pressure. Advantageously, the intermediate produced by action of the acidic catalyst normally contains some branching. In some cases, this branching is present to such an extent that the hydrogenation catalyst need not possess the dewaxing or isomerization activity of the hydrogenation catalyst used with the basic catalyst. The reaction product is a lube base stock or a mixture of hydrocarbons that can be separated into a diesel fuel fraction and a lube base stock fraction by distillation.

In another embodiment, there is provided a method of making a lube base stock from a feedstock of biological origin in a single reactor, comprising the following steps, in non-limiting fashion:
a) converting a feedstock of biological origin to a fatty acid;
b) coupling the fatty acid to a ketone and/or a heavier oxygenate with a basic catalyst, and/or dimerizing the fatty acid to a dimer acid and a higher oligomer with an acidic catalyst; and
c) hydrogenating the ketone, the heavier oxygenate, the dimer acid and/or the oligomer to a hydrocarbon with a catalyst comprising a hydrogenation catalyst and a hydrothermally stable binder.

The feedstock of biological origin normally contains glycerides including triglycerides and/or lipids such as phospholipids or saccharolipids, and can further contain fatty acids, fatty acid esters, fatty alcohols, fatty olefins, mono-glycerides, and di-glycerides. In a particular aspect, the method further comprises d) hydroisomerizing the hydrocarbon produced by step c).

In yet another embodiment, there is provided a product of the reactions above which is a hydrocarbon in the diesel fuel or lube base stock range, wherein the lube product contains no more than 20% (all percentages herein are based on total weight of the composition) of 2-ring naphthenic, at least 20% of paraffin, and no more than 60% of 1-ring naphthenic. The lube product may also contain at least 0.5% but no more than 10% of aromatic carbon based on $^{13}C$ NMR spectrum. The lube basestock has pour point lower than 0° C., kinematic viscosity Kv100 of 3-100 cSt, and a viscosity index (VI) of at least 90.

BRIEF DESCRIPTION OF THE DRAWINGS

FIG. 8 is a $^1H$ NMR spectrum of a lube base stock product derived from rapeseed oil over γ-alumina and a hydrogenation catalyst stacked-bed (Example 2).

FIG. 9 is a $^{13}C$ NMR spectrum of a lube base stock product derived from rapeseed oil over γ-alumina and a hydrogenation catalyst stacked-bed (Example 2).

FIG. 15 shows a scheme of a reaction system suitable for performing a process according to an aspect of the disclosure.

DETAILED DESCRIPTION

Figure 1:
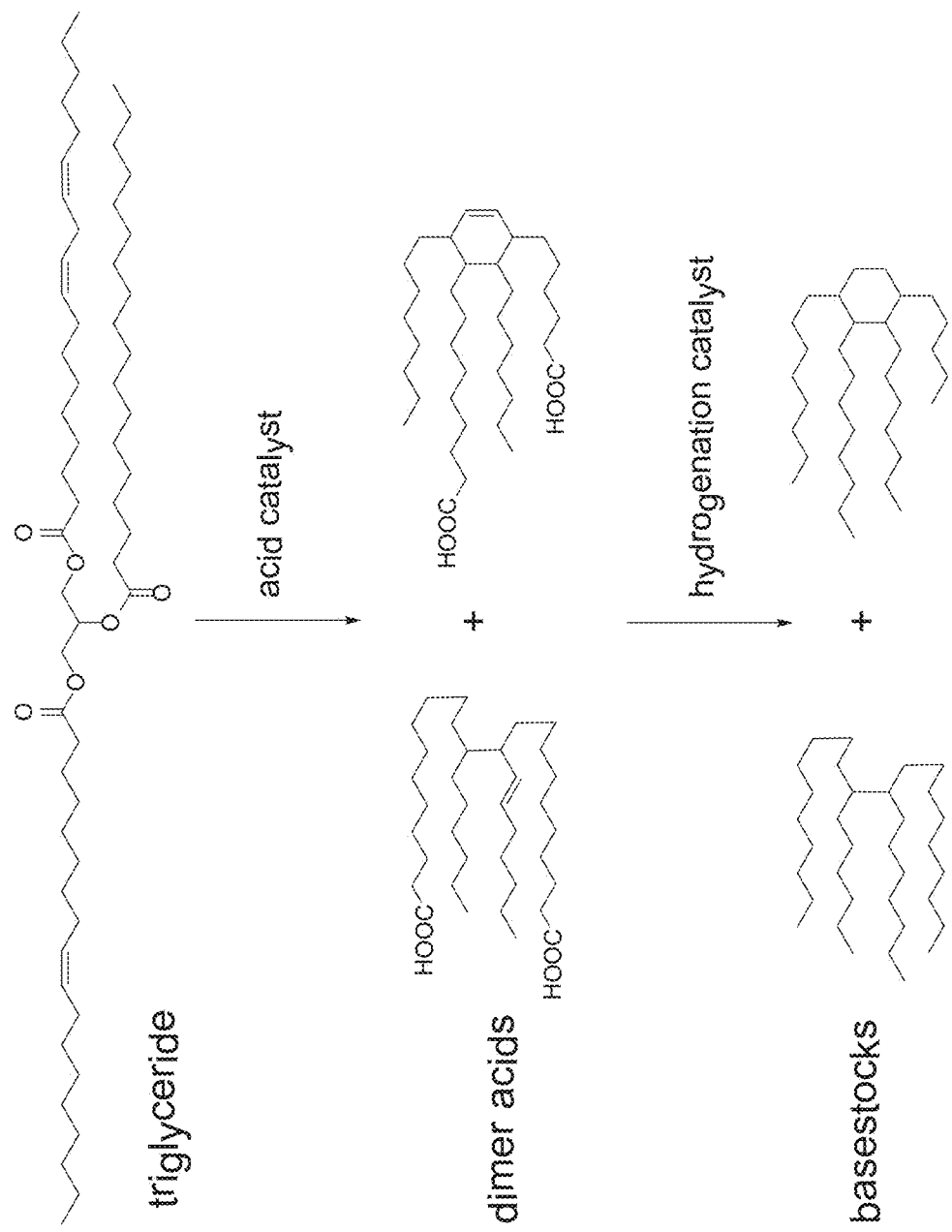
FIG. 1 is a scheme illustrating reactions occurring under conditions of combining acid catalysts and hydrogenation catalysts.

All numerical values within the detailed description and the claims herein are modified by "about" or "approximately" the indicated value, and take into account experimental error and variations that would be expected by a person having ordinary skill in the art.

In one embodiment, a process for producing a lube basestock and/or a diesel fuel hydrocarbon from a feedstock of biological origin, the method comprising: contacting the feedstock in a single reactor in the presence of hydrogen with catalyst components comprising a first catalyst and a second catalyst, wherein the first catalyst comprises an acidic material, a basic material, or a combination of both, and wherein the second catalyst comprises a hydrogenation catalyst and a hydrothermally stable binder. The feedstock of biological origin normally comprises one or more components selected from the group consisting of fatty acids, fatty acid esters, fatty alcohols, fatty olefins, mono-glycerides, di-glycerides, tri-glycerides, phospholipids and saccharolipids. The first catalyst comprises an acidic material, a basic material, or a combination of both. Acidic catalysts, basic catalysts, and hydrogenation catalysts are selected from those described below. In various embodiments, the hydrogenation catalysts also provide functionality for such conversions as hydrogenation of olefins, acids, and ketones, as well as isomerization to introduce branching to the hydrocarbon molecules and/or provide a dewaxing function.

The method involves converting a feedstock derived from biological sources into hydrocarbons under certain catalytic conditions. In one embodiment, the feedstock is contacted with a basic catalyst and a hydrogenation catalyst in a single reactor; in another embodiment the feedstock is contacted with an acidic catalyst and a hydrogenation catalyst in a single reactor, all in the presence of hydrogen. The hydrocarbon product contains diesel fuel and/or lube base stock hydrocarbons.

In yet another embodiment, the method involves converting a feedstock derived from biological sources into hydrocarbons, wherein the feedstock is contacted with an acid catalyst, a base catalyst, and a hydrogenation catalyst in a single reactor, in the presence of hydrogen. The hydrocarbon product contains diesel fuel and/or lube base stock hydrocarbons.

Although the disclosure is not limited to any theory of how it works, it is believed that conversion of the feedstock to the lube base stock proceeds with at least some of the following reactions being carried out in a single reactor as a result of contact with the catalyst components:

a) converting a feedstock of biological origin to a fatty acid;
b) coupling the fatty acid to a ketone and/or a heavier oxygenate with a basic catalyst, and/or dimerizing the fatty acid to a dimer acid and a higher oligomer with an acidic catalyst; and
c) hydrogenating the ketone, the heavier oxygenate, the dimer acid and/or the oligomer to a hydrocarbon with a catalyst comprising a hydrogenation catalyst and a hydrothermally stable binder. The feedstock of biological origin normally contains glycerides including tri-glycerides and/or lipids such as phospholipids or saccharolipids, and can further contain fatty acids, fatty acid esters, fatty alcohols, fatty olefins, mono-glycerides, and di-glycerides. In a particular aspect, the method further comprises d) hydroisomerizing the hydrocarbon produced by step c). The hydroisomerizing step lowers the amount of wax in the composition and produces a hydrocarbon mixture suitable for a lube base.

In particular, it is believed that a basic catalyst and/or an acidic catalyst component, when present, will contribute to reaction b). Reaction a) is believed to be due at least in part to hydrolysis by water, either present in feed or produced in subsequent steps by interaction of the feedstock with the acidic, basic, or hydrogenation catalyst.

The hydrocarbon product of the single reactor catalytic process has desirable properties for a hydrocarbon lube base stock. In various embodiments, it contains by weight no more than 20% of 2-ring naphthenics and no more than 60% of 1-ring naphthenics, and it contains at least 20% of paraffins, as determined by two-dimensional gas chromatography, wherein the values are weight percent. The product may also contain 0.5% or more, but generally no more than 10% of aromatic carbon based on $^{13}$C NMR spectrum.

The lube basestock has pour point lower than 0° C., kinematic viscosity Kv100 of 3 to 100 cSt, and a viscosity index of at least 90.

As mentioned, the process in some embodiments produces diesel fuel range hydrocarbons, which are conveniently distilled off from the lube base stock described herein.

Further description of the feedstock, catalytic components, reaction conditions, and product properties for the various embodiments of the disclosure is given below. Except where the context provides otherwise, it is to be understood that the description of starting materials, catalysts, conditions, and products is generally applicable to all aspects and embodiments of the disclosure described and/or claimed herein.

Feedstocks

Feedstocks for the process are drawn from renewable sources of biological origin, e.g., plant, algae or animal (including insect) origin. Animal, algae and plant oils containing tri-glycerides, as well as partially processed oils containing mono-glycerides and di-glycerides are included in this group. Another source of feedstock is phospholipids or saccharolipids containing fatty acid esters in their structure, such as phosphatidyl choline and the like present in plant cell walls. Carbon numbers for the fatty acid component of such feedstocks are generally in the range of $C_{12}$ or greater, up to $C_{30}$.

Other components of the feed can include a) plant fats, plant oils, plant waxes; animal fats, animal oils, animal waxes; fish fats, fish oils, fish waxes, and mixtures thereof; b) free fatty acids or fatty acids obtained by hydrolysis, acid trans-esterification or pyrolysis reactions from plant fats, plant oils, plant waxes, animal fats, animal oils, animal waxes, fish fats, fish oils, fish waxes, and mixtures thereof; c) esters obtained by trans-esterification from plant fats, plant oils, plant waxes, animal fats, animal oils, animal waxes, fish fats, fish oils, fish waxes, and mixtures thereof, d) esters obtained by esterification of free fatty acids of plant, animal and fish origin with alcohols, and mixtures thereof; e) fatty alcohols obtained as reduction products of fatty acids from plant fats, plant oils, plant waxes, animal fats, animal oils, animal waxes, fish fats, fish oils, fish waxes, and mixtures thereof; and f) waste and recycled food grade fats and oils, and fats, oils and waxes obtained by genetic engineering, and mixtures thereof.

Examples of vegetable oils that can be used in accordance with this disclosure include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil. Vegetable oils as referred to herein can also include processed vegetable oil material as a portion of the feedstock. Non-limiting examples of processed vegetable oil material include fatty acids and fatty acid alkyl esters. Alkyl esters typically include $C_1$-$C_5$ alkyl esters. One or more of methyl, ethyl, and propyl esters are desirable.

Examples of animal fats that can be used in accordance with the disclosure include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. In particular embodiments, alkyl esters are one or more of methyl, ethyl, and propyl esters.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Algal sources for algae oils can include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui,* and *Chlamydomonas reinhardtii*. Additional or alternate algal sources can include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platvmonas, Pleurochrysis, Pleurococcus, Prototheca, Pseudochlorella, Pyramimonas, Pyrobotrys, Scenedesmus, Skeletonema, Spyrogyra, Stichococcus, Tetraselmis, Thalassiosira, Viridiella,* and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrir, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrir, Scytonema, Spirulina, Stanieria, Starria, Stigonema, Symploca, Synechococcus, Synechocystis, Tolypothrix, Trichodesmium, Tychonema,* and *Xenococcus* species.

Other feeds usable in the present disclosure can include any of those that comprise primarily triglycerides and free fatty acids (FFAs). The triglycerides and FFAs typically contain aliphatic hydrocarbon chains in their structure having from 8 to 36 carbons, particularly from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material is made of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. If triglycerides are present, a majority of triglycerides present in the feed can particularly be comprised of $C_{12}$ to $C_{22}$ fatty acid constituents, based on total triglyceride content. Other types of feed that are derived from biological raw material components can include fatty acid esters, such as fatty acid alkyl esters (e.g., FAME and/or FAEE).

For reactions with feedstocks having a relatively higher degree of unsaturation, an acidic catalyst can be used to promote dimerization and oligomerization. The dimers and oligomers are branched or having cyclic structures, so that subsequent hydrogenation under the action of the hydrogenation catalyst produces saturated branched or cyclized hydrocarbons than can be naturally very low in wax and require little if any dewaxing. If the feedstock is highly saturated, action of a basic catalyst produces straight chain products that are subsequently hydrogenated to relatively straight chain hydrocarbons that normally require some dewaxing to make them suitable lube stocks. Dewaxing can be provided by the hydrogenation catalyst, as further described below.

One method for characterizing the triglycerides in a feedstock is based on the number of carbons in the side chains. While some feedstocks may have consistent numbers of carbons in each side chain, such as in a tristearin feedstock, many types of triglycerides will have variations in chain length between molecules and even within molecules. In order to characterize these variations, the average number of carbons per side chain in the triglycerides can be determined. By definition, a triglyceride contains three side chains. Each side chain contains a number of carbons, as mentioned above. By averaging the number of carbons in each side chain for the triglycerides in a feedstock, an average side chain length can be determined. The average number of carbons (also referred to as average carbon number) per side chain in the feedstock can be used as a comparative value for characterizing products. For example, the average number of carbons per side chain in the feedstock can be compared with the average number of carbons in hydrocarbons generated by converting and/or isomerizing the triglyceride-containing feedstock.

In various aspects, the production of fatty acid coupling products and corresponding hydrogenated products is based on processing of triglycerides within the feed. Thus, the presence of at least some triglycerides within the feed is desirable. The feed can include at least 10 wt % of feed based on a renewable source or sources, such as at least 25 wt %. In particular embodiments, the renewable portion of the feed is at least 50 wt %, or at least 75 wt %, or at least 90 wt %, or at least 95 wt %. Such higher amounts of feed from a renewable source provide an advantage based on the greater amount of renewable material. Additionally or alternately, the feed can be entirely a feed from a renewable source, or the feed can include 99 wt % or less of a feed based on a renewable source, or 90 wt % or less, or 75 wt % or less, or 50 wt %/o or less.

Higher amounts of feed from a renewable source provide an advantage based on the greater amount of renewable material, as well as potentially including a greater amount of triglycerides. Feeds with lower amounts of renewable materials may have other processing advantages. Such advantages can include improved flow characteristics within a reaction system, as renewable feeds often have a relatively high viscosity compared to conventional diesel or lubricant feeds in a refinery. Additionally, deoxygenation of a renewable feed can generate a substantial amount of heat due to formation of highly favorable products from a free energy standpoint, such as $H_2O$ and $CO_2$. For a typical catalyst bed with a bed length of 25 to 30 feet (9 to 10 meters), it may be preferable to have a temperature increase across the bed of 100° F. (55° C.) or less. If deoxygenation of a renewable feed with high oxygen content is performed using a sufficiently reactive catalyst, an exotherm of greater than 100° F. across the catalyst bed can be generated. Blending a renewable feed with a portion that does not contain oxygen can reduce the exotherm generated across a catalyst bed used for performing deoxygenation.

Thus the feedstock can contain a number of components. It can be supplied as a solution in a suitable solvent (particularly a non-reactive solvent such as a hydrocarbon), or the feedstock can be supplied neat. The main reactions are thought to be coupling or oligomerizing the fatty acid components (which produces intermediate products of suitable carbon number to be useful as diesel fuel and lube base stocks upon hydrogenation), and hydrogenating the resulting products to remove functional groups and produce a saturated hydrocarbon.

The feed may contain various amount of mineral feed as diluent. The advantages of increased mineral feed content are largely due to dilution of the renewable feed, as the processing conditions effective for deoxygenation of a renewable feed will have a low or minimal impact on a typical hydroprocessed mineral feed. Therefore, while the deoxygenation conditions are effective for deoxygenation of renewable feeds at a variety of blend ratios with mineral feeds, it may be preferable to have at least 75 wt % of the feed from a renewable source, such as at least 90 wt % or at least 95 wt %.

One option for increasing the renewable content of a feed while retaining some of the benefits of adding a feed with reduced oxygen content is to use recycled product from processing of renewable feed as a diluent. A recycled product from processing a renewable feed is still derived from a renewable source, and therefore such a recycled product is counted as a feed portion from a renewable source. Thus, a feed containing 60% renewable feed that has not been processed and 40% of a recycled product from processing of the renewable feed would be considered as a feed that includes 100% of feed from a renewable source. As an example, at least a portion of the product from processing of a renewable feed can be a diesel boiling range product. Such a recycled diesel boiling range product will be deoxygenated, and therefore incorporation of the recycled diesel boiling range product in the feed will reduce the exotherm generated during deoxygenation. Adding a recycled diesel boiling range product is also likely to improve the cold flow properties of a renewable feed. More generally, any convenient product from processing of a renewable feed can be recycled for blending with the renewable feed in order to improve the cold flow properties and/or reduce the oxygen content of the input flow to a deoxygenation process. If a recycled product flow is added to the input to a deoxygenation process, the amount of recycled product can correspond to at least 10 wt % of the feed to the deoxygenation process, such as at least 25 wt %, or at least 40 wt %. Additionally or alternately, the amount of recycled product in a feed can be 60 wt % or less, such as 50 wt % or less, 40 wt % or less, or 25 wt % or less.

With regard to triglyceride content, the feedstock can include at least 10 wt %, such as at least 25 wt %, and particularly at least 40 wt %, or at least 60 wt %, or at least 80 wt %. Additionally or alternately, the feed can be composed entirely of triglycerides, or the triglyceride content of the feed can be 90 wt % or less, such as 75 wt % or less, or 50 wt % or less. The methods described herein are suitable for conversion of triglycerides to lubricant and diesel products in a single reactor, so higher contents of triglycerides may be advantageous. However, to the degree that a recycle loop is used to improve the feed flow properties or reduce the reaction exotherm across catalyst beds, lower triglyceride contents may be beneficial.

While feed dilution can be used to control the exotherm generated across a catalyst bed used for deoxygenation, it is noted that some processing options can also impact the exotherm. One alternative is to use a less reactive catalyst, so that a larger amount of catalyst is needed at a given liquid hourly space velocity (LHSV) in order to deoxygenate a feed to a desired level. Another option is to reduce the amount of hydrogen provided for the deoxygenation process. Still another option could be to introduce additional features into a reactor to assist in cooling and/or transporting heat away from a deoxygenation catalyst bed. In combination with selecting an appropriate amount of product recycle and/or blending of another non-oxygenated feed, a desired combination of a flow characteristics and heat generation during deoxygenation can be achieved.

Oxygen is the major heteroatom component in renewable base feeds. A renewable feedstream based on a vegetable oil, prior to hydrotreatment, includes up to 10 wt % oxygen, for example up to 12 wt % or up to 14 wt %. Such a renewable feedstream, also called a biocomponent feedstream, normally includes at least 1 wt % oxygen, for example at least 2 wt %, at least 3 wt %, at least 4 wt %, at least 5 wt %, at least 6 wt %, or at least 8 wt %. Further, the renewable feedstream, prior to hydrotreatment, can include an olefin content of at least 3 wt %, for example at least 5 wt % or at least 10 wt %.

Biocomponent based feedstreams have a wide range of nitrogen and/or sulfur contents depending on the feed sources. For example, a feedstream based on a vegetable oil source can contain up to 300 wppm nitrogen. In some embodiments, the sulfur content can be 500 wppm or less, for example 100 wppm or less, 50 wppm or less, or 10 wppm or less, where wppm stands for parts per million by weight.

Acidic and Basic Catalysts—Definition

Catalysts that have sufficient acidic or basic properties to be effective in coupling fatty acids, fatty acid esters, fatty alcohols, fatty olefins, or glycerides (mono-, di-, or tri-glycerides) can be identified by determining the molar ratio of chemisorption of $CO_2$ and $NH_3$ over these materials. $CO_2$, a weak acid, is used to titrate the basic sites present on the catalysts. Likewise, $NH_3$, a strong base, is titrated to indicate the acidic sites on these materials. Many factors determine the actual amount of chemisorption, such as surface area of the material (often significantly affected by the catalyst preparation method), the temperature at which the chemisorption is measured, and the pressure at which the chemisorption is tested. The ratio of adsorbed $CO_2$ and $NH_3$ indicates a relative acidity or basicity.

For the present purposes, a "basic" catalyst is defined as material having a molar ratio of chemisorption of $CO_2$ per gram of material to the chemisorption of $NH_3$ per gram of material greater than 0.5, typically greater than 0.75, and especially greater than 1.0, when tested as described below. In non-limiting examples, the "carbon dioxide/ammonia ratio" ranges from 1.0 to 100; particularly from 1.0 to 50; or more particularly from 1.0 to 40.

An "acidic" catalyst is defined as catalyst having a carbon dioxide/ammonia ratio of less than 0.5, typically less than 0.3, and especially less than 0.2, when tested as described below. In various embodiments, the values range from 0.05 to 0.5; particularly from 0.05 to 0.3; or more particularly from 0.05 to 0.2.

Determination of carbon dioxide/ammonia ratio (i.e. the molar ratio of chemisorption of $CO_2$ per gram of catalyst to the chemisorption of $NH_3$ per gram of catalyst) is conducted using a Mettler TGA/SDTA 851 thermogravimetric analysis system at ambient pressure. The catalyst sample is calcined in flowing air at 500° C. for three hours or at least until a constant sample weight is obtained. The temperature of the sample is then reduced in flowing air (helium could also be used) to the desired temperature of chemisorption. Next, the sample is allowed to equilibrate at the desired temperature in flowing helium and weighed. Chemisorption of carbon dioxide is measured at 150° C., and chemisorption of ammonia is measured at 250° C. After being weighed, the sample is subjected to a number of pulses (12 seconds/pulse) of gaseous mixture containing helium and either carbon dioxide or ammonia until a constant weight is obtained. The gas mixture contains 10 mole percent carbon dioxide or ammonia with the remainder being helium. After each pulse of the gas mixture being tested, the sample is flushed with flowing helium for 3 minutes. 20 separate pulses of the gas mixture are used in each test. The increase in weight of the sample in terms of mg/g material based on the sample weight after calcination is used to determine the moles of $CO_2$ or $NH_3$ adsorbed per gram of material.

Molar ratios of chemisorption of $CO_2$ to the chemisorption of $NH_3$ per gram of material for some representative catalysts are shown in Table 2.

TABLE 2

| Materials | $CO_2/NH_3$ Chemisorption Molar Ratio |
|---|---|
| MgO (Elastomag 170) | 7.82 |
| MgO (MagChem 200AD) | 6.92 |
| γ-$Al_2O_3$ (Alfa # 43832) | 0.47 |
| Hydrotalcite (Pural MG30) | 1.35 |
| Hydrotalcite (Pural MG63) | 1.95 |
| Hydrotalcite (Pural MG70) | 2.30 |
| W/$ZrO_2$ | 0.07 |
| $La_2O_3$ | 6.64 |
| La/$SiO_2$ | 0.92 |
| $AlPO_x$ | 0.75 |
| $NdAlPO_x$ | 1.04 |
| $YAlPO_x$ | 0.86 |
| $PrAlPO_x$ | 1.05 |
| La/$ZrO_2$ (700° C. calcined) | 1.06 |
| $Y_2O_3$—5% $ZrO_2$ | 6.17 |
| $Y_2O_3$—25% $ZrO_2$ | 1.18 |
| $Nd_2O_3$ | 35.37 |
| $Sm_2O_3$ | 15.61 |
| $Y_2O_3$ | 14.95 |
| $CeO_2$ | 8.48 |
| $Pr_2O_3$ | 1.56 |
| $TiO_2$ | 0.55 |
| $ZrO_2$ | 0.33 |
| SAPO-34 | 0.19 |
| ZSM-5 | 0.16 |
| $SiO_2$ | 0.02 |
| USY | 0.00 |
| 75/25 $SiO_2/Al_2O_3$ | 0.38 |
| 50/50 $SiO_2/Al_2O_3$ | 0.47 |
| 25/25 $SiO_2/Al_2O_3$ | 0.41 |
| 13/87 $SiO_2/Al_2O_3$ | 0.42 |
| $La_2O_3/SiO_2$ | 0.92 |
| MCM-41 | 0.44 |

Catalysts suitable for use to couple fatty acids, fatty acid esters, fatty alcohols, fatty olefins, or glycerides (mono-, di-, or tri-glycerides) are drawn from oxides and mixed oxides of metals of Group 1 to Group 6, Group 12 to Group 15, Lanthanide Series, or Actinide Series of the Periodic Table of Elements. The catalysts can also comprise acidic or basic clays such as hydrotalcites, bentonite, montmorillonite, aluminosilicates such as zeolites, aluminophosphates, or metalloaluminophosphates (where metal is, for example, Si, Nd, Y, Pr, Ce, Ti, or Zr).

In one embodiment, the coupling catalysts comprise two or more metal oxides, particularly one Group 4 metal oxide and one or more selected from Group 2, Group 3, Lanthanide Series, and Actinide Series metal oxides. Yet in another embodiment, the coupling catalysts are selected from oxides of Group 2, Group 12, or Group 13 elements, and mixtures thereof. In another embodiment, the coupling catalysts are either naturally occurring or synthetic clays such as hydrotalcite, bentonite, montmorillonite, or mixtures thereof. Compositions for each individual component in the oxide mixtures can vary within the range of 1-99/%. The oxides can be prepared using a variety of methods, although generally they are prepared by converting a suitable precursor by precipitation from solution and/or calcination. Suitable precursors include metal salts, such as halides, sulfates, phosphates, halides, nitrates, hydroxides, oxychlorides, alkoxides, and acetates.

In one embodiment, a metal oxide useful as a catalyst is produced by first preparing a liquid solution comprising a salt of the metal in a solvent, such as water. The resultant solution is then subjected to conditions sufficient to cause precipitation of the solid oxide material, such as by the addition of a precipitating reagent, typically a base such as sodium hydroxide or ammonium hydroxide. The liquid solution is generally maintained at a temperature at or below 200° C. during the precipitation, for example in the range of from 0° C. to 200° C., such as from 20° C. to 100° C. In an embodiment, the resulting gel is hydrothermally treated at a temperature of at least 80° C., particularly at least 100° C., for up to 10 days, such as up to 5 days, for example up to 3 days. The resulting material is then recovered, for example by filtration or centrifugation, washed, and dried. The resulting particulate material is typically then calcined, normally in an oxidizing atmosphere, at a temperature of at least 400° C., such as from 400° C. to 800° C. for up to 48 hours, such as for 0.5 hours to 24 hours, for example for 1 hour to 10 hours.

When two or more metal oxides are used for the coupling of fatty acids, fatty acid esters, fatty alcohols, fatty olefins, or glycerides (mono-, di-, or tri-glycerides), they may either be co-precipitated or precipitated separately and combined with each other at any later stage of processing including as calcined solid particles.

Basic Catalysts

Coupling of fatty acids forming ketones (ketonic decarboxylation), for example, is catalyzed by a component having adequate basicity to catalyze the reaction. They are referred to herein as base catalysts, basic catalysts, basic material, or other similar phrases. It is believed that basic catalysts promote the hydrolysis of triglyceride into fatty acids and the coupling of the fatty acids. Advantageously, catalysis by a basic catalyst or catalyst component leads to coupling of fatty acid components to form chemical species having twice the number of carbons as the starting material fatty acids. This conveniently produces hydrocarbons (after subsequent hydrogenation in the presence of other catalysts) in the $C_{24}$ and higher range that are suitable as lube base stocks.

According to the definitions used here, basic catalysts are a class of materials with the "carbon dioxide/ammonia ratio" in the range of 1-100; particularly from 1.0 to 50; or more particularly from 1.0 to 40. Examples of suitable basic catalyst components include, but are not limited to, basic clays such as a hydrotalcite; an alkali impregnated support such as $K_2CO_3$ on $SiO_2$, $ZrO_2$ or $TiO_2$; a basic metal oxide such as MgO, CaO, BaO, ZnO, and $MnO_2$; rare-earth metal oxides such as $La_2O_3$, $CeO_2$, $Y_2O_3$, $Sm_2O_3$, and $Pr_2O_3$; mixed rare earth metal oxides such as $La_2O_3/ZrO_2$, $ZnO/La_2O_3$, $Y_2O_3/ZrO_2$, $CeO_2/ZrO_2$, and $La_2O_3/SiO_2$; or mixtures thereof.

To convert triglycerides over a base catalyst, a triglyceride-containing feed is exposed to the catalyst under effective conditions to convert triglycerides to fatty acid coupled products. The effective conditions for the triglyceride conversion reaction include a temperature from 300° C. to 450° C. A liquid hourly space velocity of from 0.1 to 10 v/v/h, particularly 0.5 to 5 v/v/h, can be applied. It is not believed that hydrogen gas is required to facilitate the condensation reaction. However, in embodiments where a single reactor is used for both the basic catalyst and the hydrogenation catalyst, hydrogen will typically be present in order to facilitate the hydrogenation reaction. As a result, a hydrogen partial pressure of 1.8 MPag to 34.6 MPag will also typically be present.

Exposure of triglycerides to the base catalyst will generate a mixture of products, with majority products being fatty ketones. It is believed that the fatty ketones are formed via reactions between the fatty acid side chains of the triglyceride.

The basic catalysts according to the disclosure allow for conversion of triglycerides to fatty ketones without requiring addition of water for an initial hydrolysis reaction, although water can be optionally added to the reactor. Instead, exposing a triglyceride-containing feedstock to the base catalysts in the presence of hydrogen allows for conversion of triglycerides to a mixture of ketones.

In a particular embodiment, a catalyst selected for catalyzing the conversion of triglycerides to ketones will remain stable in the reaction environment. The conversion of triglycerides to ketones using a base catalyst results in some production of water, so catalysts that deteriorate in water may pose some difficulties in scaling up a process for commercial use.

Acidic Catalysts

Fatty acid coupling can also be catalyzed by a catalyst component having adequate acidity to catalyze the conversion chemistry. They are referred to herein as acid catalysts, acidic catalysts, acidic material, or other similar phrases. According to the definitions used here, acidic catalysts are a class of materials with the "carbon dioxide/ammonia ratio" in the range of 0.05 to 0.5; particularly from 0.05 to 0.3; or more particularly from 0.05 to 0.2. Examples of acid catalyst include but are not limited to large pore zeolites (e.g., Faujasite, Beta, and the MWW families), medium (10-ring) to small (8-ring) pore zeolites (e.g., MFI, CHA, MOR, etc.) with small particle sizes, acidic mixed metal oxides ($WO_x/ZrO_2$, $MoO_x/ZrO_2$), alumina, silica-alumina, and acidic clays, or mixtures thereof.

Although the acidic catalysts can perform other functions in the complicated one step conversion of feedstock to lube base stock, a key function is to catalyze the reaction of unsaturated fatty acids to make dimers and higher oligomers of fatty acids. For this reason, the acidic catalysts can be referred to as oligomerization catalyst. Oligomerization reactions are carried out with suitable catalysts at high temperature. Suitable catalysts include molecular sieves (both aluminosilicate zeolites and silicoaluminophosphates), metalloaluminophosphates, amorphous aluminosilicates, cationic acidic clays, and other solid acid catalysts or mixtures thereof. According to International Zeolite Association (IZA) definitions, molecular sieves can be categorized according to the size of the pore opening. Examples of the molecular sieves can be of the large (>12-ring pore opening), medium (10-ring opening) or small (<8-ring pore opening) pore type. The molecular sieves structure types can be defined using three letter codes. Non-limiting examples of small pore molecular sieves include AEI, AFT, ANA, APC, ATN, ATT, ATV, AWW, BIK, CAS, CHA, CHI, DAC, DDR, EDI, ERI, GIS, GOO, KFI, LEV, LOV, LTA, MER, MON, PAU, PHI, RHO, ROG, SOD, THO, and substituted forms thereof. Non-limiting examples of medium pore molecular sieves include AFO, AEL, EUO, HEU, FER, MEL, MFI, MTW, MTT, MWW, TON, and substituted forms thereof. Non-limiting examples of large pore molecular sieves include BEA, CFI, CLO, DNO, EMT, FAU, LTL, MOR and substituted forms thereof. In one embodiment, zeolite catalysts have a Si/Al molar ratio of greater than 2 and at least one dimension of the pore openings greater than or equal to 10-ring. In a particular embodiment, solid zeolites for some embodiments include ZSM-5 (MFI), zeolite beta (BEA), USY family zeolites (FAU), MCM-22, MCM-49, and MCM-56 (MWW). Mesoporous materials with pore openings greater than 20 angstroms, such as the MCM-41 family and SBA-15 type with aluminum incorporated into the structure and thus possessing acidity, can also be used as oligomerization catalysts.

Another class of acidic materials is metalloaluminophosphates (MeAPO), where the metal is selected from silicon; transition metal elements such as Ti, Zr, Fe, Co, Ni, Cu and Zn; and rare-earth elements such as Y, La, Ce, Pr, Nd, Sm and Gd. Acidic clays include acidic, natural or synthetic montmorillonites, bentonite, silica clay, alumina clay, magnesia clay, and silica-alumina clay. Commercially available acidic forms of Filtrol clays are also suitable.

Other solid acid catalysts, such as acidic mixed metal oxides $WO_3/ZrO_2$, and $MoO_3/ZrO_2$, other metal oxides such as sulfated zirconia, $SiO_2/ZrO_2$, $Al_2O_3/ZrO_2$, $MgO/SiO_2$, and Nafions or other acidic ion-exchanged resins such as Dowex and Amberlyst cation exchanged resin are also suitable for the oligomerization reaction.

The acid catalysts according to the disclosure allow for conversion of triglycerides to fatty acid dimers and oligomers without requiring addition of water for an initial hydrolysis reaction, although water can be optionally added to the reactor. Instead, exposing a triglyceride-containing feedstock to the acid catalysts in the presence of hydrogen allows for conversion of triglycerides to a mixture of fatty acid dimers and oligomers.

In cases where starting materials of biological origin are used for the production of base oils, it is necessary to extend the hydrocarbon chain length to reach the carbon number range required in the base oil applications, leaving predominantly carbon-carbon bonds in the main structure of the molecule. According to the disclosure, this is carried out by allowing the feed containing triglycerides to react over an acid catalyst, thus yielding hydrocarbons with carbon numbers in the range from $C_{18}$ to $C_{180}$. In base oil applications, the carbon number range is typically from $C_{18}$ to $C_{144}$. In the reaction, the triglycerides are hydrolyzed in-situ generating fatty acids. The fatty acids, particularly unsaturated fatty acids, are oligomerized, thus forming oligomers of fatty acids. For lube base oil applications, dimers of fatty acids are desirable, although trimers and tetramers are also formed and may be used to make high viscosity basestocks. In case the feedstock contains polyunsaturated hydrocarbon chains, after oligomerization, greater amounts of trimers and higher oligomers may form and may contain ring structures.

With acidic catalysts, it is advantageous to use feed stock containing higher than 20% mono-unsaturated acid or ester, alternatively, higher than 40%, alternatively, higher than 50%, alternatively higher than 60% mono-unsaturated acid or ester. Mixed unsaturated acid or esters, containing $C_{12}$, $C_{14}$, $C_{16}$, $C_{18}$, $C_{20}$, $C_{22}$, or $C_{24}$ unsaturated acid and/or esters can be used as feed. In some embodiments, the combination of the acids is chosen to give the average carbon number of feeds in the range of $C_{14}$ to $C_{22}$. This range of feed is most likely to produce final lube base stock with viscosity ranging from 3 cSt at 100° C. to 100 cSt at 100° C.

The acid catalyzed coupling reactions are carried out at suitable temperatures, for example 150° C. to 400° C., 200° C. to 400° C., or 250° C. to 350° C. A liquid hourly space velocity of from 0.1 to 10 v/v/h, particularly 0.5 to 5 v/v/h, is applied. It is not believed that hydrogen gas is required to facilitate the condensation reaction. However, in embodiments where a single reactor is used for both the acid catalyst and the hydrogenation catalyst, hydrogen will typically be present in order to facilitate the hydrogenation reaction. As a result, a hydrogen partial pressure of 1.8 MPag to 34.6 MPag will also typically be present. The presence of hydrogen may reduce the cyclic oligomer formation. This is beneficial for production of high paraffinic hydrocarbons at the end of the conversion.

Hydrogenation Catalyst

After fatty acid coupled products are formed from triglycerides or other components of a feedstock, a second catalyst is used to hydrogenate them. Particularly, the second catalyst is also suitable for isomerizing the resulting hydrogenated molecules where needed. An additional consideration in selecting a second catalyst is that the catalyst should be stable in the presence of water, due to the water generated during conversion of the triglycerides to ketones.

Figure 2:
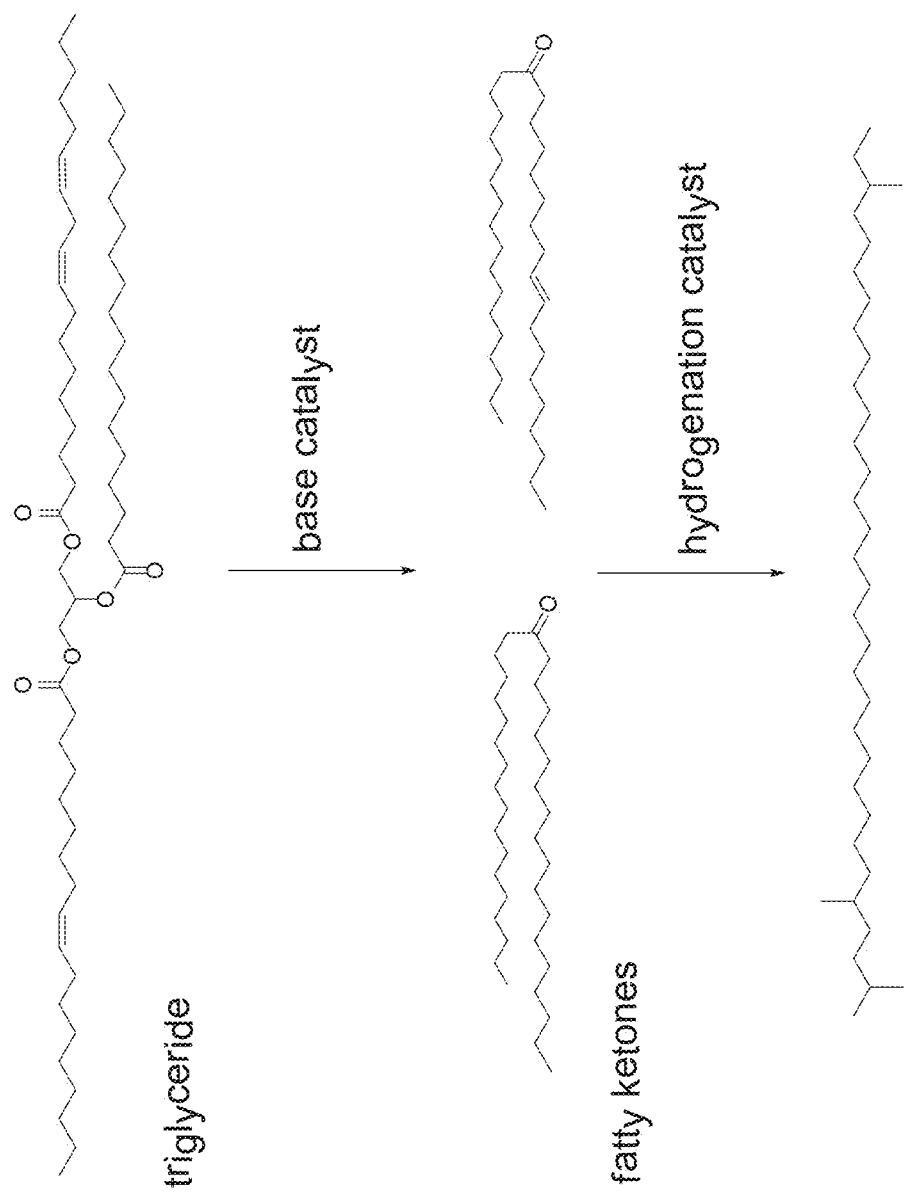
FIG. 2 is a scheme illustrating reactions occurring under conditions of combining base catalysts and hydrogenation catalysts.

The hydrogenation catalyst promotes the reaction of hydrogen with olefinic unsaturation in fatty acids, fatty acid dimers and oligomers, ketones, heavier oxygenates, and other intermediate reaction products such as those shown in FIGS. 1 and 2. It further acts to reduce carbonyl, carboxyl, hydroxyl, and other oxygen containing groups to provide the saturated hydrocarbons as reaction products. Working in concert with the acidic or basic coupling catalysts, it also provides isomerization functionality, helping to introduce sufficient branching in the final hydrocarbon products, where needed, to give basestocks with suitable pour point and low temperature properties.

Catalysts suitable for hydrogenation reaction include metals such as Mo, Re, Fe, Ru, Co, Rh, Ir, Ni, Pd, Pt, Cu, Zn, as well as binary or ternary mixtures thereof supported on silica, alumina, titania, zirconia, clays such as Kieselguhr, amorphous aluminosilicates, or zeolites. For example, the catalysts include Mo, Co, Ni, Pd, Pt, and binary or ternary mixtures thereof supported on silica, alumina, amorphous aluminosilicates, clays, or Kieselguhr. In an embodiment, the catalysts are Ni supported on Kieselguhr, CoMo on gamma-alumina, and NiMo on ganmma-alumina. Metal content in the catalyst ranges from 0.1 wt % to 70 wt % of the catalyst.

In one embodiment, a hydrogenation catalyst is made of a transition metal and an acidic component as support. Non-limiting examples include Ni, Co, Pd, Pt, Ru, Rh. Co—Mo, and Ni—Mo, particularly supported on an inorganic support such as alumina, amorphous aluminosilicates, acidic clays or zeolites. The acidity of the support helps introducing branching, such as methyl branching, to long-chain hydrocarbons, thus isomerizing the long-chain hydrocarbons. With the metal hydrogenation functionality and the acidic component isomerization functionality, this type of catalyst is sometimes referred to as hydroisomerization catalyst. Non-limiting examples of the hydroisomerization catalyst include metals supported on zeolites, such as noble metals on 10-ring uni-dimensional zeolites, including Pt, Pd, or a mixture thereof for the metal and ZSM-22, ZSM-23, ZSM-35, ZSM-4, ZBM-30 or ZSM-48 for the zeolite. Other zeolites that can be used include, but are not limited to, the MCM-22 family of zeolites.

Hydrogenation catalysts having hydroisomerization functionality are sometimes referred as dewaxing catalysts in the art. The dewaxing catalyst comprises a metal hydrogenation component, an acidic component such as zeolites, and a binder.

Examples of suitable hydrogenation catalysts that have a dewaxing effect comprise zeolites as the acidic component that performs dewaxing primarily by isomerizing a hydrocarbon feedstock. These hydrogenation catalysts may be preferred for use in conjunction with a basic catalyst, which tends to produce ketone intermediates that are relatively unbranched. In an embodiment, the zeolites have a unidimensional (or one dimensional) pore structure. Exemplary one-dimensional zeolites include ZSM-22, ZSM-12, ZSM-23, ZSM-4, ZSM-48, and ZSM-50.

Suitable zeolites include 10-member ring pore zeolites, such as EU-1, ZSM-35 (or ferrierite), ZSM-1, ZSM-57, NU-87, SAPO-1, and ZSM-22. In particular embodiments, suitable zeolites include EU-2, EU-11, ZBM-30, ZSM-48, and ZSM-23. In some particular embodiments, zeolite is ZSM-48. Note that a zeolite having the ZSM-23 structure with a silica to alumina ratio of from 20:1 to 40:1 can sometimes be referred to as SSZ-32. Other molecular sieves that are iso-structural with the above materials include Theta-, NU-10, EU-13, KZ-1 and NU-23.

Particularly, the hydrogenation catalysts used in processes according to the disclosure have a zeolite component with a low ratio of silica to alumina. For example, for ZSM-48, the ratio of silica to alumina in the zeolite can be less than 200:1, or less than 110:1, or less than 100:1, or less than 90:1, or less than 80:1. In various embodiments, the ratio of silica to alumina is from 30:1 to 200:1, 60:1 to 110:1, or 70:1 to 100:1.

The hydrogenation catalysts with dewaxing for use with basic catalysts also include a metal hydrogenation component. The metal hydrogenation component is typically a Group VI and/or a Group VIII metal. In various embodiments, the metal hydrogenation component is a Group VIII noble metal. In non-limiting fashion, the metal hydrogenation component is Pt, Pd or a mixture thereof. In another embodiment, the metal hydrogenation component is a combination of a non-noble Group VIII metal and a Group VI metal. Suitable combinations include Ni, Co or Fe with Mo or W, particularly Ni with Mo or W.

The metal hydrogenation component may be added to the catalyst in any convenient manner. One technique for adding the metal hydrogenation component is by incipient wetness. For example, after combining a zeolite and a hydrothermally stable binder, the combined zeolite and binder are extruded into catalyst particles. The catalyst particles are exposed to a solution containing a suitable metal precursor containing the Group VI or Group VIII metal. Alternatively, metal can be added to the catalyst by ion exchange, where a metal precursor is added to a mixture of zeolite (or zeolite and binder) prior to extrusion.

In various embodiments, the amount of metal in the catalyst is at least 0.1 wt % based on catalyst, at least 0.15 wt %, at least 0.2 wt %, at least 0.25 wt %, at least 0.3 wt %, or at least 0.5 wt % based on catalyst. In exemplary fashion, the amount of metal in the catalyst is 20 wt % or less based on catalyst, 10 wt % or less, 5 wt % or less, 2.5 wt % or less, 1 wt % or less. For embodiments where the metal is Pt, Pd, another Group VIII noble metal, or a combination thereof, the amount of metal is from 0.1 to 5 wt %, from 0.1 to 2 wt %, from 0.25 to 1.8 wt %, or from 0.4 to 1.5 wt %, in non-limiting examples. For embodiments where the metal is a combination of a non-noble Group VIII metal with a Group VI metal, the combined amount of metal is from 0.5 wt % to 20 wt %, or 1 wt % to 15 wt %, or 2.5 wt % to 10 wt %, by way of non-limiting example.

Hydrothermally Stable Binders and Hydrogenation Catalysts

In various embodiments, a second catalyst comprises a hydrogenation catalyst which is bound using a binder to increase mechanical strength and stability of the catalyst in the presence of water under effective hydrogenation conditions. Such a binder is referred to herein as a hydrothermally stable binder. Non-limiting examples of suitable binders are refractory oxides such as silica, alumina, silica-alumina, titania, zirconia, ceria, and mixtures thereof.

In particular embodiments, a hydrothermally stable binder is selected from metal oxides such as titanium oxides, zirconium oxides, cerium oxides, or a combination thereof (e.g., $TiO_2$, $ZrO_2$, $CeO_2$ and a mixture thereof). In some embodiments, the catalyst for hydrogenation and isomerization includes a binder material that provides enhanced activity and/or stability for hydrogenation and isomerization, such as a titania binder.

Optionally, the hydrogenation catalysts are formulated using a low surface area binder, where a low surface area binder is one with a surface area of 100 $m^2/g$ or less, 80 $m^2/g$ or less, or 70 $m^2/g$ or less. In various embodiments, the binder and the zeolite particle size are selected to provide a catalyst with a desired ratio of micropore surface area to total surface area. In hydrogenation catalysts used according to the disclosure, and in exemplary fashion those used along with a basic material as coupling catalyst, the micropore surface area corresponds to surface area from the unidimensional pores of zeolites in the hydrogenation catalyst. The total surface corresponds to the micropore surface area plus the external surface area. Any binder used in the catalyst will not contribute to the micropore surface area and will not significantly increase the total surface area of the catalyst. The external surface area represents the balance of the surface area of the total catalyst minus the micropore surface area. Both the binder and zeolite can contribute to the value of the external surface area. In particular embodiments, the ratio of micropore surface area to total surface area for a hydrogenation catalyst will be equal to or greater than 25%.

A zeolite can be combined with a binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

In yet another embodiment, a binder composed of a mixture of two or more metal oxides is used. In the case where the two or more metal oxides of the binder have different surface areas, the weight percentage of the binder with lower surface area may be greater than the weight percentage of the binder having higher surface area. Alternatively, if both metal oxides used for forming a mixed metal oxide binder have a sufficiently low surface area, the proportions of each metal oxide in the binder are less important. When two or more metal oxides are used to form a binder, the two metal oxides can be incorporated into the catalyst by any convenient method. In one example, a first binder is mixed with the zeolite during formation of the zeolite powder, such as during spray drying. The spray dried zeolite, binder powder is then mixed with the second metal oxide binder prior to extrusion.

First and Second Catalysts

In various embodiments, the first catalyst is referred to as a fatty acid coupling catalyst since, whether the catalyst is an acidic material or basic material as described above, it is believed to contribute to coupling of the fatty acid side chains of glycerides or phospholipids or saccharolipids present in biologically derived feedstocks to produce molecules with increased carbon number. The second catalyst is referred to as hydrogenation catalyst, as described above. The hydrogenation catalyst promotes the reaction of hydrogen with olefinic unsaturation in fatty acids, fatty acid dimers, oligomers, ketones, heavier oxygenates, and other intermediate reaction products such as those shown in FIGS. 1 and 2. It further acts to reduce carbonyl, carboxyl, hydroxyl, and other oxygen containing groups to provide the saturated hydrocarbons as reaction products. Working in concert with the first catalyst, the second catalyst also provides isomerization functionality where needed, helping to introduce sufficient branching in the final hydrocarbon products to give basestocks with suitable pour point and low temperature properties. An additional consideration in selecting a second catalyst is that the catalyst should be stable in the presence of water, due to the water generated during conversion of the triglycerides to ketones. By proper selection of binders, the second catalyst maintains it activity and stability under the environment where water is present.

Reaction Conditions and Process Configurations

Reaction of the feedstock with the catalysts or catalyst components is conveniently carried out in a single reactor, without the necessity of isolating and purifying the product of reaction steps, as necessitated by the multi-reactor processes of the prior art. It has been surprisingly found that reaction proceeds from feedstock to lube base stock hydrocarbon under a single set of pressure, temperature, and time conditions in the presence of hydrogen. The process simplifies production of diesel and/or basestocks from renewable feeds in that only a single reactor is dealt with.

In particular embodiments for carrying out the reaction, a layered bed or a stacked catalyst bed is used. In this configuration, a first catalyst (being the acidic, or basic catalyst or a combination of both that is mainly responsible for coupling the fatty acids to produce molecules of suitable carbon number) is disposed in the reactor so as to come into contact with the feedstock before the reacted feedstock contacts the second catalyst (the hydrogenation catalyst). Flow of the reacting material over the catalysts is controlled by varying the pressure, feed rate, and other parameters. Residence time for contact with the catalyst compositions is naturally controlled in the same way. In various embodiments, the method is adapted for batch-wise or for continuous production of fuels and lube base stock.

Hydrogen is present throughout the reactor, and is consumed by the reactants during the hydrogenation step. Advantageously, it was found that the presence of hydrogen did not adversely affect the fatty acid coupling reactions believed to be catalyzed primarily by the acidic or basic catalysts. During the fatty acid coupling, hydrogen transfer reactions can lead to formation of coke molecules, which can cause catalyst deactivation. In various embodiments, the presence of hydrogen can inhibit hydrogen transfer and improve catalyst life.

Temperature and pressure of the reactor and reactants is selected depending on the throughput and turnover required. Non-limiting examples of temperatures include 100 to 500° C., 200 to 400° C., and 250 to 400° C. Hydrogen partial pressure is used in the range of from 1.8 to 34.6 MPag (250 to 5000 psig) or 4.8 to 20.8 MPag, by way of non-limiting example. Also in non-limiting fashion, a liquid hourly space velocity is from 0.2 to 10 v/v/hr, or 0.5 to 3.0, and a hydrogen circulation rate is 35.6 to 1781 $m^3/m^3$ (200 to 10,000 scf/B), particularly 178 to 890.6 $m^3/m^3$ (1000 to 5000 scf/B). Further non-limiting examples of conditions are given in working examples.

Loading of the catalyst is 1 to 30% by weight of the weight of the feedstock in the reactor, for example 2 to 20%, or 5 to 10% by weight. The reaction time or residence time can range from 5 minutes to 50 hours depending on types of catalysts used, reaction temperature and the amount (wt %) of catalyst in the reactor. In a particular embodiment, a residence time is 10 minutes to 10 hours. Shorter residence time gives better efficiency for reactor usage. Longer residence time ensures high conversion to pure hydrocarbons. Usually an optimized reactor time is most desirable.

In various embodiments, the duration of the reaction (or the average residence time in the reactor for a continuous process) is 1-48 hours, 1-20 hours, 12-36 hours, or 24-30 hours. In various embodiments, the reactions are carried out in a fixed bed reactor, a continuous stir tank reactor, or a batch reactor. In any of these operations, it is advantageous to maintain partial pressure of hydrogen above 300 psi, above 400 psi, above 500 psi, above 600 psi, or above 700 psi. During conversion, carbon dioxide and water generated from the action of the acidic or basic catalyst on the feedstock fatty acids are present in gaseous form, and thus increase the total reactor pressure. Under this condition, it can be important to maintain hydrogen partial pressure. By way of non-limiting example, this can be achieved by intermittently purging the reactor gas and re-charging with hydrogen gas in batch or CSTR operation. Alternatively, in a fixed bed operation, this can be achieved by withdrawing reactor gas at different locations along the fixed bed reactor; or alternatively by stage injection of hydrogen. Other means to maintain hydrogen pressure are also possible.

In an embodiment, a method of this disclosure is carried out with a basic catalyst selected from $La_2O_3/ZrO_2$, $La_2O_3/ZnO$ and $Y_2O_3/ZrO_2$, where the La content is 5 to 10 wt % in the mixture, and a hydrogenation catalyst which is Pt supported on ZSM-48 with a binder selected from $TiO_2$, $ZrO_2$ and a mixture thereof (0.3 to 1% Pt on the catalyst) or ZSM-48/$NiWO_x$ (20 to 40% $NiWO_x$) at a temperature of 300 to 400° C. under $H_2$ partial pressure of 500 to 800 psig.

In another embodiment, a method of this disclosure is carried out with an acidic catalyst selected from acidic clay such as Montmorillonite and bentonite, and acidic mixed metal oxides such as $WO_x/ZrO_2$, and a hydrogenation catalyst selected from Ni or Pd supported on silica or carbon, Co—Mo or Co—W supported on gamma-alumina, and Ni—Mo or Ni—W supported on gamma-alumina where metal content in the catalyst ranges from 0.1 wt % to 70 wt % of the catalyst at a temperature of 250 to 350° C. under $H_2$ partial pressure of 500 to 800 psig.

There are several alternatives for how to incorporate the hydrogenation catalyst in the reaction system. One option is to configure the fatty acid coupling catalyst and the hydrogenation catalyst as stacked beds. In this type of configuration, a reactor or reaction system will contain one or more initial beds of fatty acid coupling catalyst for converting triglycerides to one or more of ketones, heavier oxygenates, dimer acids and oligomers of fatty acids. As described above, exposing a triglyceride-containing feed to the one or more initial beds of fatty acid coupling catalysts (first catalyst) will result in production of an effluent containing ketones, heavier oxygenates, dimer acids, or oligomers of fatty acids based on the fatty acid side chains in the triglycerides. The effluent containing these oxygenates is then exposed to one or more beds of a hydrogenation catalyst under effective hydrogenation conditions. This can result in hydrogenation of products formed by the action of the first catalyst.

Where needed, the hydrogenation catalyst can introduce branches into the final hydrocarbon products to provide a dewaxing function. For triglycerides with only saturated fatty acid side chains, the combination of fatty acid coupling (particularly using a basic material as the first catalyst) and hydrogenation will be relatively unbranched hydrocarbons.

For triglycerides with both saturated and unsaturated fatty acid side chains, the combination of fatty acid coupling and hydrogenation will be mixtures of branched hydrocarbons (containing one or more branches of various lengths in the range of 1 to 10 carbons) and naphthenics substituted with various lengths of hydrocarbon chains. Of course, if the side chains of the triglycerides contain other types of heteroatoms, such as nitrogen or sulfur, other types of molecules may be generated.

For triglycerides with side chains containing between 12 and 22 carbon atoms, the stacked bed configuration of the fatty acid coupling catalyst and hydrogenation catalyst will result in production of hydrocarbon molecules that boil in the lubricant boiling range as a primary product, with some production of hydrocarbon molecules that boil in the diesel boiling range. The lubricant boiling range molecules correspond to fatty acid coupling products that were formed during conversion of the triglycerides in the feedstock. These fatty acid coupling products are subsequently hydrogenated and isomerized. However, while the process of converting triglycerides will typically occur at percentages approaching 100%, less than all of the side chains in the triglycerides may result in formation of coupling products. Instead, at least a portion of the side chains from the triglycerides will reach the hydrogenation catalyst without combining with another side chain to form a lubricant boiling range molecule. These uncombined side chains are also deoxygenated and isomerized by the hydrogenation catalyst, resulting in diesel boiling range molecules. Thus, a stacked bed arrangement for the catalysts would be expected to generate a majority portion of lubricant boiling range molecules from a triglyceride feed and a minority portion of diesel boiling range molecules.

An alternative configuration is to combine both the fatty acid coupling catalyst and the hydrogenation catalyst in the same catalyst bed. In this type of configuration, both the coupling catalyst and the hydrogenation catalyst are exposed to the initial feed. In this type of configuration, an increased amount of the initial triglycerides in the feed will be converted to diesel boiling range molecules. This is believed to be due to the ability of the hydrogenation catalyst to deoxygenate the side chains of the triglycerides (or of an intermediate product of the triglycerides, such as fatty acids) before reaction to form fatty acid coupled products can occur.

By blending varying amounts of hydrogenation catalyst and coupling catalyst in a combined catalyst bed, the ratio of the amount of diesel boiling range molecules versus lubricant boiling range molecules can be adjusted. Thus, still another option is to use "stacked" beds of various mixtures of the coupling catalyst and the hydrogenation catalyst. For example, a catalyst bed or beds containing 80% of a coupling catalyst and 20% of a hydrogenation catalyst will produce a larger amount of lubricant boiling range molecules than a catalyst bed or beds containing 25% of the coupling catalyst and 75% of the hydrogenation catalyst. Another option for controlling the relative amounts of lubricant and diesel boiling range molecules is to combine the stacked bed and mixed bed concepts. For example, an initial bed or an initial portion of a catalyst bed can correspond to a coupling catalyst such as an acid catalyst, a second bed or bed portion can correspond to another coupling catalyst such as a base catalyst or a mixture of acid and base coupling catalysts, and a third bed or portion can correspond to a hydrogenation catalyst. Still other options for setting up various types of gradients in the amount of coupling catalyst and hydrogenation catalyst can also be used.

In order to provide a general way of characterizing the hydrocarbons resulting from conversion, hydrogenation, and isomerization of a triglyceride feed, the average number of carbons (i.e., average carbon number) in hydrogenated molecules derived from triglycerides can be compared with the average number of carbons in the fatty acid side chains of the triglycerides. The average number of carbons in hydrocarbon molecules derived from triglycerides in a feed can be at least 1.5 times the average number of carbons in the fatty acid side chains of the corresponding triglycerides, such as at least 1.75 time the average number of carbons in the fatty acid side chains or at least 1.9 times the average number of carbons in the fatty acid side chains.

In a particular embodiment, the average carbon number of hydrocarbons produced by conversion of feedstock based triglycerides or other fatty esters is two times or more that of the fatty acid components of the feedstock. The first catalyst is believed to increase carbon number in the product by a factor of approximately two or more comparing to the carbon numbers of the fatty acid side chains in the feed, by the process of coupling (oligomerization, ketonization, and aldol condensation).

FIG. 15 schematically illustrates an example of a reactor suitable for processing a triglyceride-containing feed. In FIG. 15, reactor 310 is shown as containing reaction zones 322 and 342. Each reaction zone can correspond to one or more catalyst beds. Alternatively, one or more reactors may be used in a cascade configuration, and any convenient number of reaction zones may be used within a reactor.

In stacked bed configuration, reaction zone 322 can contain one or more catalyst beds of an acidic or basic catalyst or a combination of both. The triglyceride containing feedstock 305 is introduced into reactor 310 so that the feedstock is exposed to the catalyst in the catalyst beds in reaction zone 322 prior to being exposed to the catalyst in reaction zone 342. In FIG. 15, hydrogen treat gas 301 is shown as entering reactor 310 in a co-current manner relative to the flow of the feedstock 305. Alternatively, hydrogen treat gas can be introduced into reactor 310 in other convenient manners, such as introducing the hydrogen treat gas to flow counter-current relative to feedstock 305.

After passing through reaction zone 322, the effluent is exposed to the catalyst in the one or more catalyst beds in reaction zone 342. Depending on the configuration, reaction zone 342 is an optional reaction zone. For example, in a configuration where only mixed beds of catalyst are used, only a single reaction zone 322 may be needed. The effluent from reaction zone 342 (or optionally reaction zone 322) then exits the reactor as a product effluent flow 345.

In one type of stacked bed configuration, the one or more catalyst beds in reaction zone 322 corresponds to an acidic or basic catalyst or a combination of both, while the one or more catalyst beds in reaction zone 342 correspond to a hydrogenation catalyst. In another type of stacked bed configuration, one or both of reaction zones 322 and 342 can contain mixed beds of an acidic or a basic catalyst or a combination of both, as well as a hydrogenation catalyst. In this type of configuration, the volume percentage of the hydrogenation catalyst is greater in the catalyst beds in reaction zone 342 as compared to the volume percentage of hydrogenation catalyst in the catalyst beds in reaction zone 322.

Still another option is to have a uniform mixture of hydrogenation catalyst and an acidic or a basic catalyst or a combination of both within the reaction zones in the reactor. In this type of configuration, reaction zone 342 is optional, as the same or similar conditions are present throughout the reactor. Thus, all catalyst beds within the reactor can alternatively be thought of as being in reaction zone 322.

Further Processing

The product of the one-pot reaction described herein is a mixture of hydrocarbons, largely saturated, having a carbon number in the diesel fuel and lube base stock range. If desired, the reaction product can be hydrofinished by subjecting it to low pressure hydrogen. This process can clean up residual unsaturations and oxygenates that may result when the products are being heated in the presence of the hydrogenation catalyst, which can have some cracking power given that it may contain an acidic carrier such as a zeolite. The hydrofinishing can be carried out either in a fixed-bed or in an autoclave reactor. The catalyst can be either noble metal (Pd, Pt, Rh, Ru, Ir, or combination thereof) or non-noble metal (Co, Ni, Fe), particularly supported on a support such as clay, alumina, aluminosilicate, silica, titania and zirconia. The weight hourly space velocity can be in the range of 0.5 to 10 $h^{-1}$, under a hydrogen pressure in the range of ambient to 30 MPag, and a temperature from 150° C. to 400° C. The resulting product can then be further processed by distillation to separate out any diesel fuel from the lube base stock.

Two-Dimensional Gas Chromatography (GC×GC) Characterization of Renewable Basestock Chemical Composition Comprehensive two-dimensional gas chromatography (GC×GC) is a separation technique developed in recent years. It can provide improved chromatographic resolution of complex mixtures. GC×GC employs a single GC unit containing two separation columns of different selectivity. A modulation unit situated between these two separation columns performs solute focusing and re-injection into a short, high-speed second column. The modulation mechanism is the key to accomplish this two-dimensional separation. GC×GC may be considered as a 'continuous' heart-cutting form of a conventional single heart-cutting multidimensional GC that has been established for many years.

These advances have enabled GC×GC to become an ideal technique for analyzing complex mixtures, such as basestocks disclosed in this application. One advantage of GC×GC technique is its enhanced sensitivity due to the re-focusing process during the modulation operation. Another advantage of the GC×GC technique is the qualitative analysis through compound class separation. Hence, in addition to single component separation, it also provides the compound class homologous series trend information. This trend information can be further combined with the reference standard compounds or the GC-MS data to greatly improve the capability of elucidation of individual molecular structure in the complex mixtures.

Figure 3:
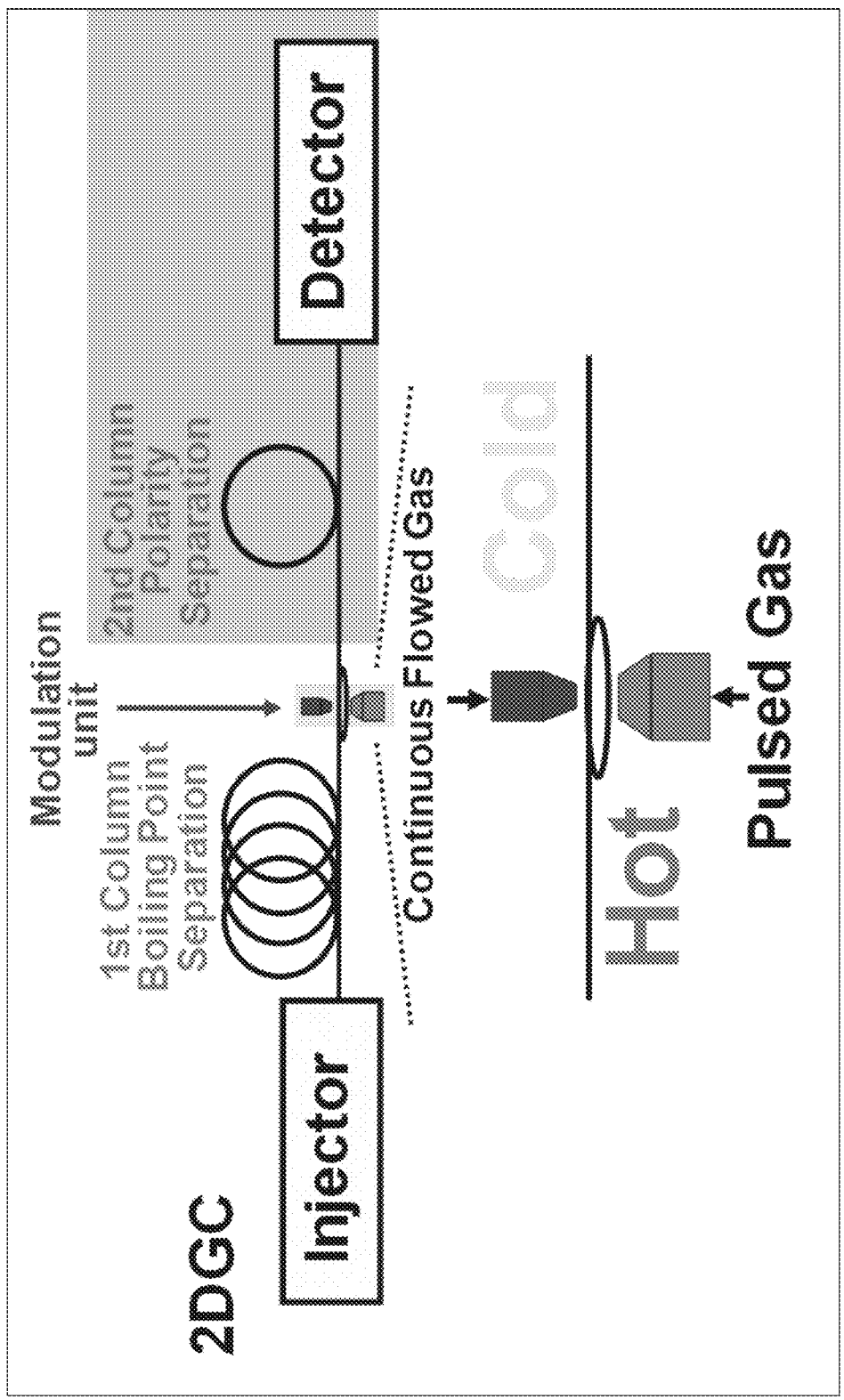
FIG. 3 shows a scheme of a two-dimensional gas chromatography (GC×GC) system

The 2DGC (GC×GC) system consists of an Agilent 6890 gas chromatograph (Agilent Technology, Wilmington, Del.) configured with inlet, columns, and detectors, shown in FIG. 3. A split/splitless inlet system with a 100 sample position tray autosampler was used. The two-dimensional capillary column system utilizes a non-polar first column (BPX-5, 30 meter, 0.25 mm I.D., 1.0 micron film), and a polar (BPX-50, 2 meter, 0.25 mm I.D., 0.25 micron film), second column. Both capillary columns are the products of SGE Inc. (Austin, Tex.). A looped thermal modulation assembly based on Zoex technology (Zoex Corp. Lincoln, Nebr.), which is liquid nitrogen cooled "trap-release" looped thermal modulator, is installed between these two columns. A flame ionization detector (FID) is used for the signal detection. A 0.2 microliter sample was injected with 50:1 split at 300° C. inlet temperature. Carrier gas flow was ramped based on the head pressure. The head pressure is programmed from 24 psi with 0-minute hold and 0.2 psi per minute increment to 42 psi with 0-minute hold. The oven was programmed from 190° C. with 0-minute hold and 2.0° C. per minute increment to 370° C. with 0-minute hold. The hot jet was programmed from 240° C. with 0-minute hold and 2.0° C. per minute increment to 390° C. with 15-minute hold. The total GC run time was 90 minutes. The modulation period was 10 seconds. The sampling rate for the detector was 100 Hz.

FIG. 3 shows a schematic of the GC×GC configuration. After data acquisition, it was processed for qualitative and quantitative analysis. The qualitative analysis converted data to a two-dimensional image that was processed by a commercial program ("Transform", Research Systems Inc. Boulder, Colo.). The two-dimensional image was further treated by "Photoshop" program (Adobe System Inc. San Jose, Calif.) to generate publication-ready images. An in-house program was used to quantify the peak volumes.

The two-dimensional chromatographic separation is a combination of non-polar column separation (1st column, X-axis) and polar column separation (2nd column, Y-axis). The non-polar column separation is based on the boiling point of the component in the sample mixture, which closely correlated to the carbon chain length. It can also be viewed as a boiling point separation. The polar column separation is based on the polarity of the component in the sample mixture, which closely correlated to the functional groups on the component. It can also be viewed as a compound class separation. With this detailed two-dimensional separation, the separated complex mixture can be systematically, qualitative and quantitative analyzed.

In addition to the qualitative analysis, the GC×GC technique also provides advantages in the quantitative analysis for complex mixtures than traditional GC. Because the GC×GC offers better separation for individual components, better-defined peak integrations and more accurate quantification are obtained. This improved quantitative analysis gives more accurate compositional information for complex mixtures such as the basestocks disclosed in this application.

This disclosure also provides various products prepared by the methods described herein, for example, lube basestock and transportation fuel. In an embodiment, there is provided lube basestock prepared by a method of this disclosure using a biologically derived oil. Lube base stock and transportation fuel such as jet fuel and diesel fuel "prepared from a biologically derived oil", as used herein, refer to products synthesized from renewable sources of biological origin. The terms are intended to exclude products derived from petroleum or crude oil. The product of the catalytic reactions described herein comprises saturated hydrocarbons in the lube base stock range (above $C_{20}$, for example $C_{28}$ or higher such as $C_{28}$-$C_{100}$), with possible co-products in the diesel fuel (<$C_{20}$) range. Generally, the lube product contains at least 20% by weight paraffins, no more than 20% 2-ring naphthenes, and no more than 60% 1-ring naphthenes based on two-dimensional GC analysis. In various embodiments, the product has greater than 30% or greater than 50% by weight paraffins based on two-dimensional GC analysis. In other embodiments it has less than 10% by weight 2-ring naphthenes and/or less than 50% by weight 1-ring naphthenes based on two-dimensional GC analysis.

The basestock has pour point lower than 0° C., particularly lower than −10° C., more particularly lower than −20°

C. The basestock has a kinematic viscosity Kv100 of 3 to 100 cSt, and a viscosity index of at least 90.

The basestock is significantly free of carbonyl groups as measured by Infrared (IR) spectroscopy, that is, there is no peak in the 1600-1800 $cm^{-1}$ region. The product is also significantly free of vinylic hydrogen as measured by Nuclear Magnetic Resonance (NMR) spectroscopy. In the $^1$H NMR spectrum, the vinylic hydrogen is less than 1%, particularly less than 0.5%, more particularly less than 0.3% of total hydrogen. The product can contain a small fraction of aromatic carbon as measured by $^{13}$C NMR: the aromatic carbon content can be in the range of 0.1 to 10%, particularly 0.2 to 10%, more particularly 0.5 to 10% of the total carbon.

As a lube stock, the product can be formulated with conventional lube additives such as antiwear agents, antioxidants, VI improvers, biocides, preservatives, extreme pressure additives, and the like to formulate lubricant compositions.

The origin of the basestocks and fuels produced by the process of this disclosure can be determined by the radioactive carbon $^{14}$C level. $^{14}$C radioactive carbon is produced in the atmosphere by collisions between cosmic-ray neutrons and $^{14}$N, after which it is quickly oxidized to $CO_2$. Plants take up the $^{14}CO_2$ for photosynthesis, and consequently they reflect "modern" levels of $^{14}$C. Once assimilation of $^{14}$C ceases, levels of $^{14}$C decrease through radioactive decay with a half-life of 5730 years. Hence, petroleum, which forms over millions of years, contains no detectable $^{14}$C. Therefore, $^{14}$C is an ideal tracer for tracing the biological component in base-stock and fuel blends because all recent natural products are effectively pre-labeled with $^{14}$C. The $^{14}$C level in the basestock and fuels produced by the process of this disclosure is about 99 to 101% of present day $^{14}$C level. When used in blends with petroleum derived basestocks or fuels, the $^{14}$C level in the blended basestock and fuels is in the range of 2 to 101% of present day $^{14}$C level.

EXAMPLES

Example 1

Figure 4:
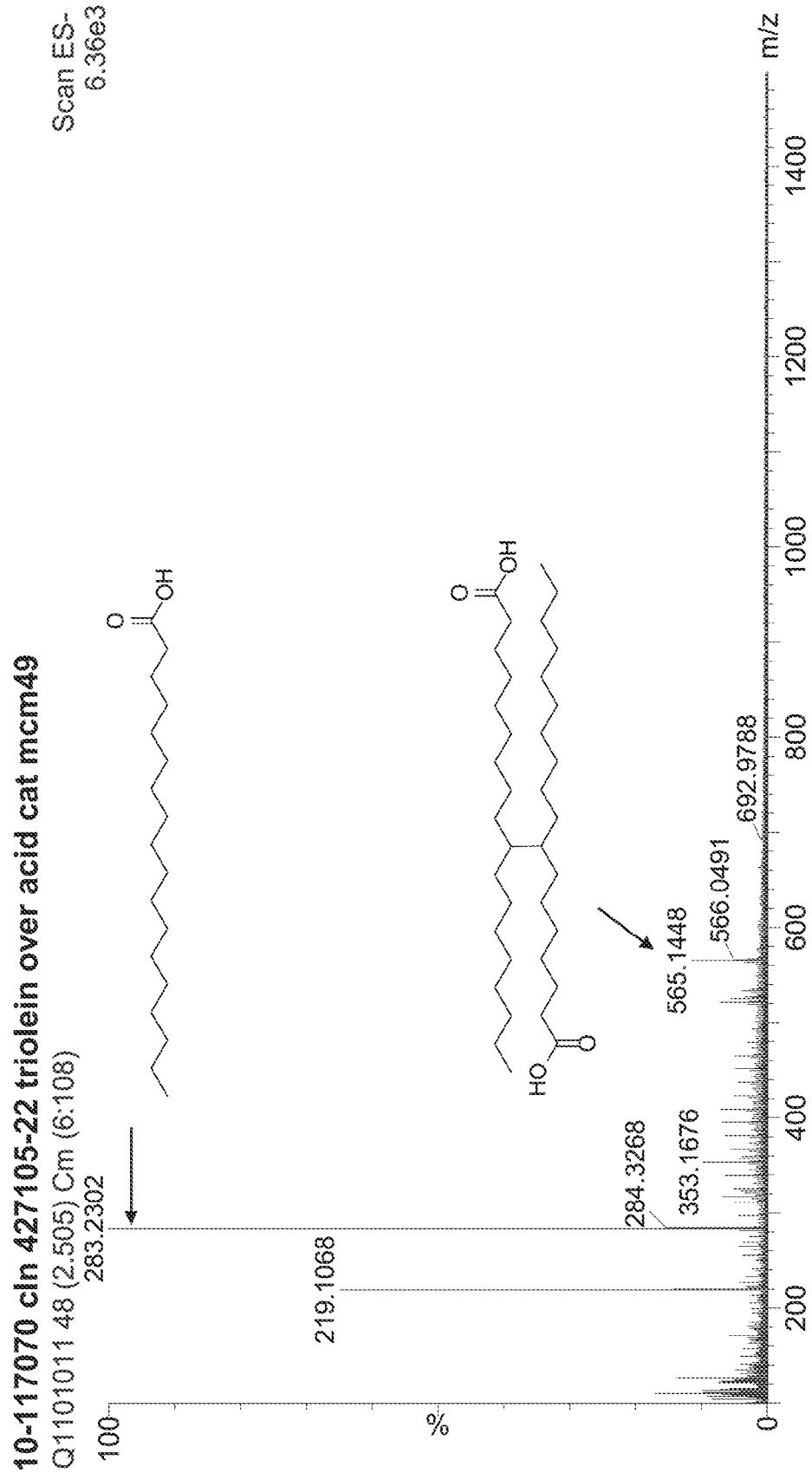
FIG. 4 is a mass spectrum of reaction products from oleic acid triglyceride (triolein) with zeolite MCM-49. Formation of dimer acid (mass 565) is shown.

Direct Conversion of Triglycerides to Dimer Acids in a Batch Reactor 0.41 g zeolite MCM-49 (80% zeolite with 20% $Al_2O_3$ binder) was mixed with 2.46 g triolein and 0.13 g water in one of 24 wells of a high throughput unit and reacted at 300° C. and 400 psig (2.6 mPag) $H_2$ for 24 hours. This gives an equivalent liquid hourly space velocity of 0.27 g/g catalyst/h. At the end of run, 83% of the starting material was recovered. The product was analyzed by mass spectroscopy and the results are shown in FIG. 4.

Dimer acid (mass=565) was observed from the reaction, together with free fatty acid stearic acid.

This example demonstrates that direct conversion of triglycerides to dimer acid is feasible in the presence of an acid catalyst.

Example 2

Direct Conversion of Rapeseed (Canola) Oil to Lube-Range Molecules in a Fixed-Bed Reactor Using γ-Alumina Stacked with a Hydrogenation Catalyst In a fixed-bed reactor (⅜"OD) was loaded these catalysts: 1.0 g of hydrogenation catalyst (titania bound Pt/ZSM-48, 0.6% Pt) sized to 20 to 40 mesh at the bottom, and 2.5 g γ-alumina (purchased from Alfa) sized to 20-40 mesh at the top. The two catalyst beds were separated by 0.5 cc of sand in between. The reactor was assembled and placed in a reactor furnace. The catalyst was pre-treated at 350° C. under flowing $H_2$ (100 cc/min) for 2 hours, then a liquid feed containing 20% rapeseed (canola oil) in dodecane was started at a flow rate of 1.0 cc/h and the $H_2$ flow was reduced to 20 cc/min at a pressure of 600 psig (4 mPag). After a 24 hour line-out period, the liquid product was collected and analyzed. GC shows 100% conversion of the triglycerides and ~30% selectivity to lube range molecules with the rest being diesel range fuel molecules.

Figure 5:
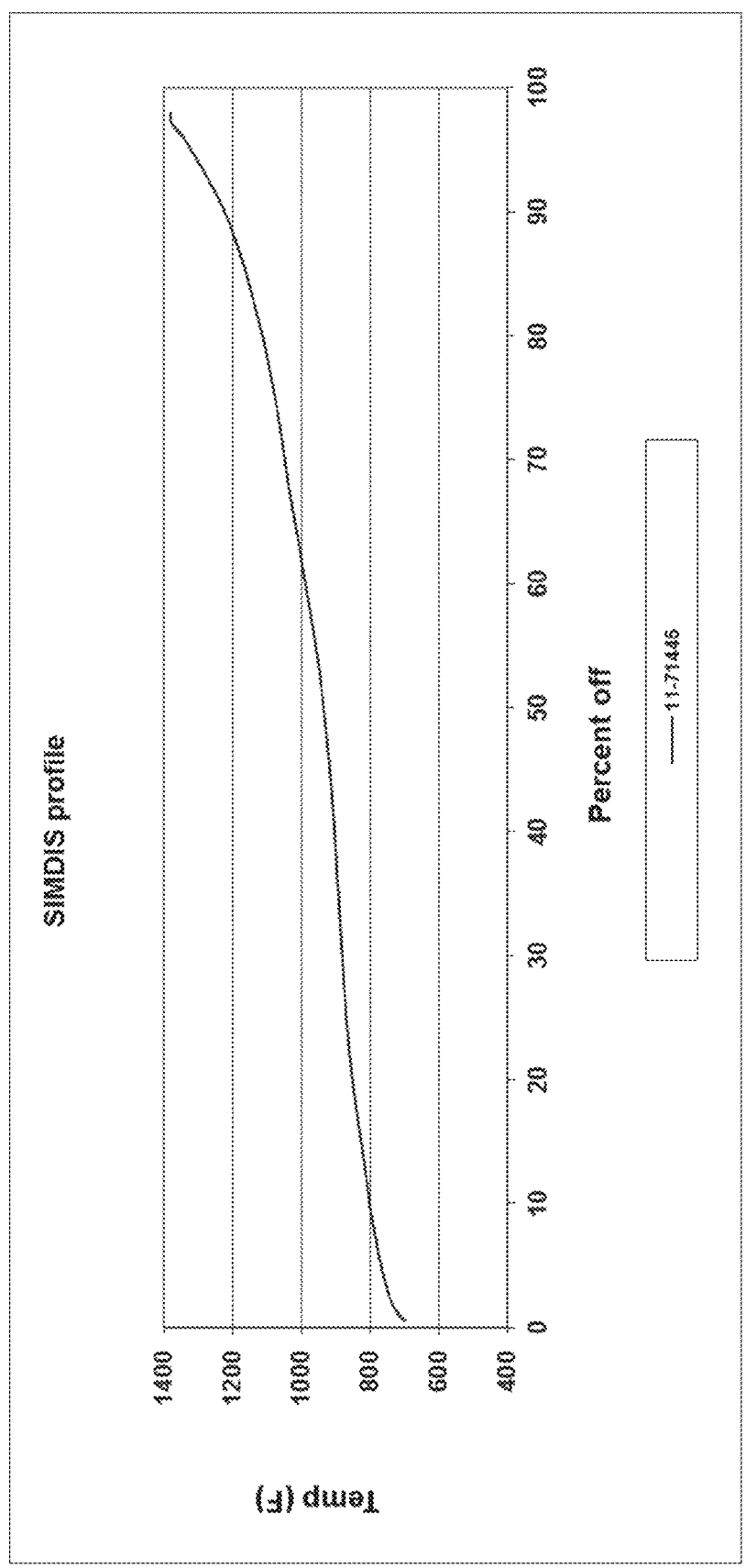
FIG. 5 is a simulated distillation profile of a lube base stock product derived from rapeseed oil over γ-alumina and a hydrogenation catalyst stacked-bed (Example 2).

The unit was continuously operated for a period of over a month. Approximately 92% of the liquid feed was recovered as liquid product. The product was subjected to Kugelrohr distillation (180° C., 1 Torr) to remove solvent dodecane and fuel range molecules. The bottom recovered from Kugelrohr distillation was the lube range product (labeled as 11-71445). Simulated distillation (SIMDIS) curve of the lube product is shown in FIG. 5.

Figure 6:
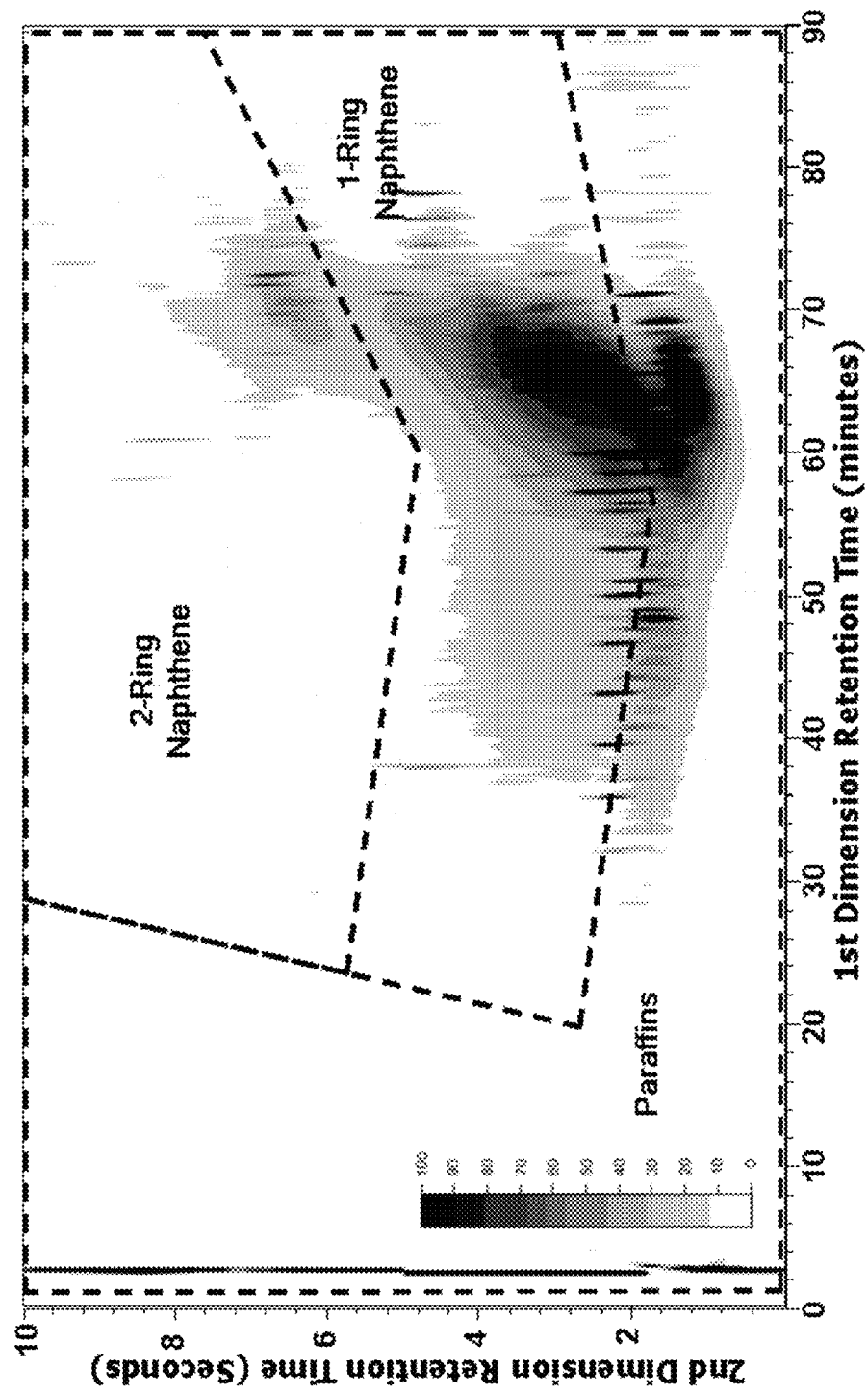
FIG. 6 is a two-dimensional gas chromatogram of a lube base stock product derived from rapeseed oil over γ-alumina and a hydrogenation catalyst stacked-bed (Example 2).

2D-GC results for the lube product are shown in FIG. 6, which reveals it contain 31% (wt.) iso-paraffins, 56% 1-ring naphthenics, and 13% 2-ring naphthenics.

Figure 7:
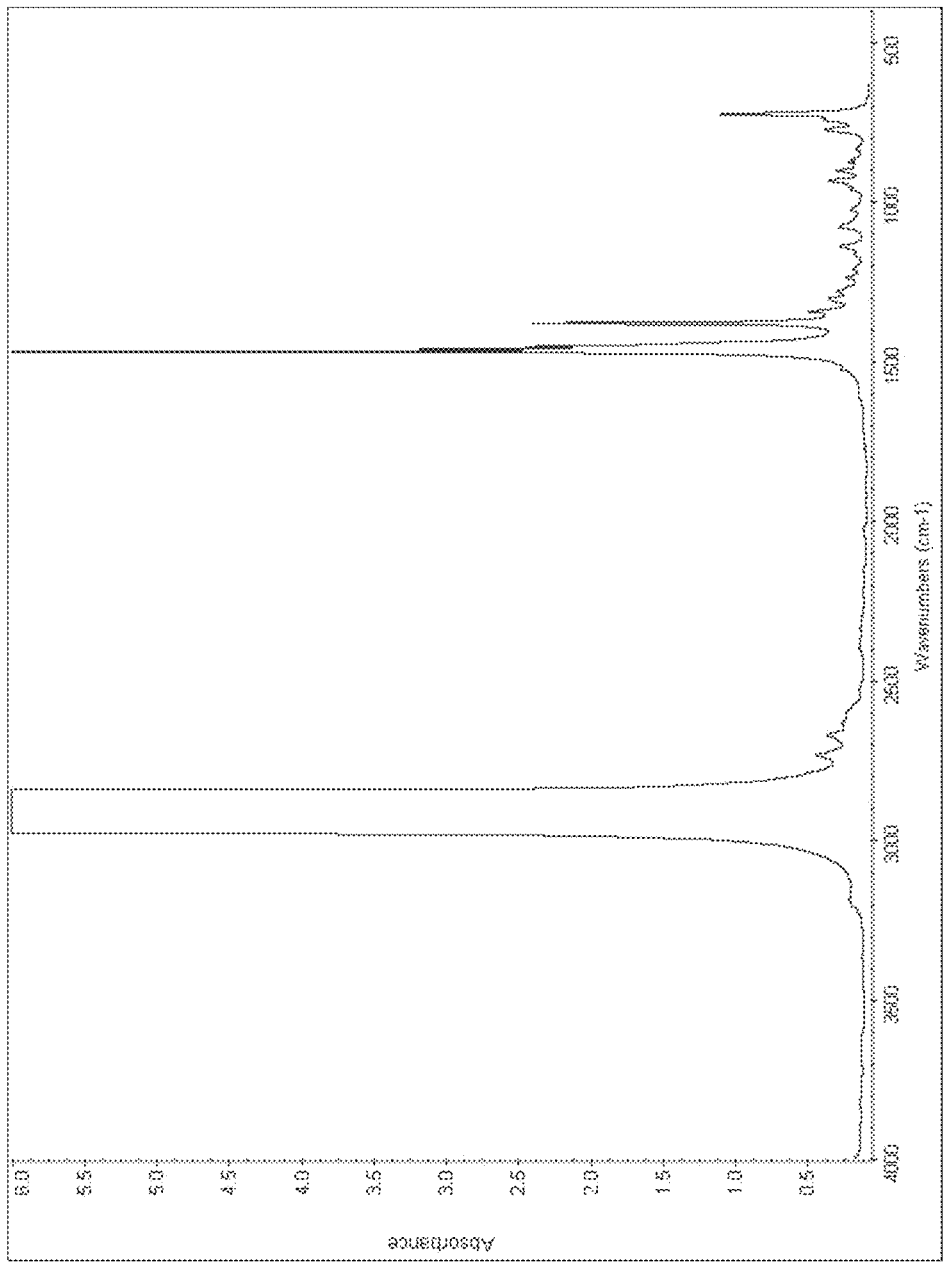
FIG. 7 is an infrared spectrum of a lube base stock product derived from rapeseed oil over γ-alumina and a hydrogenation catalyst stacked-bed (Example 2).
Figure 8:
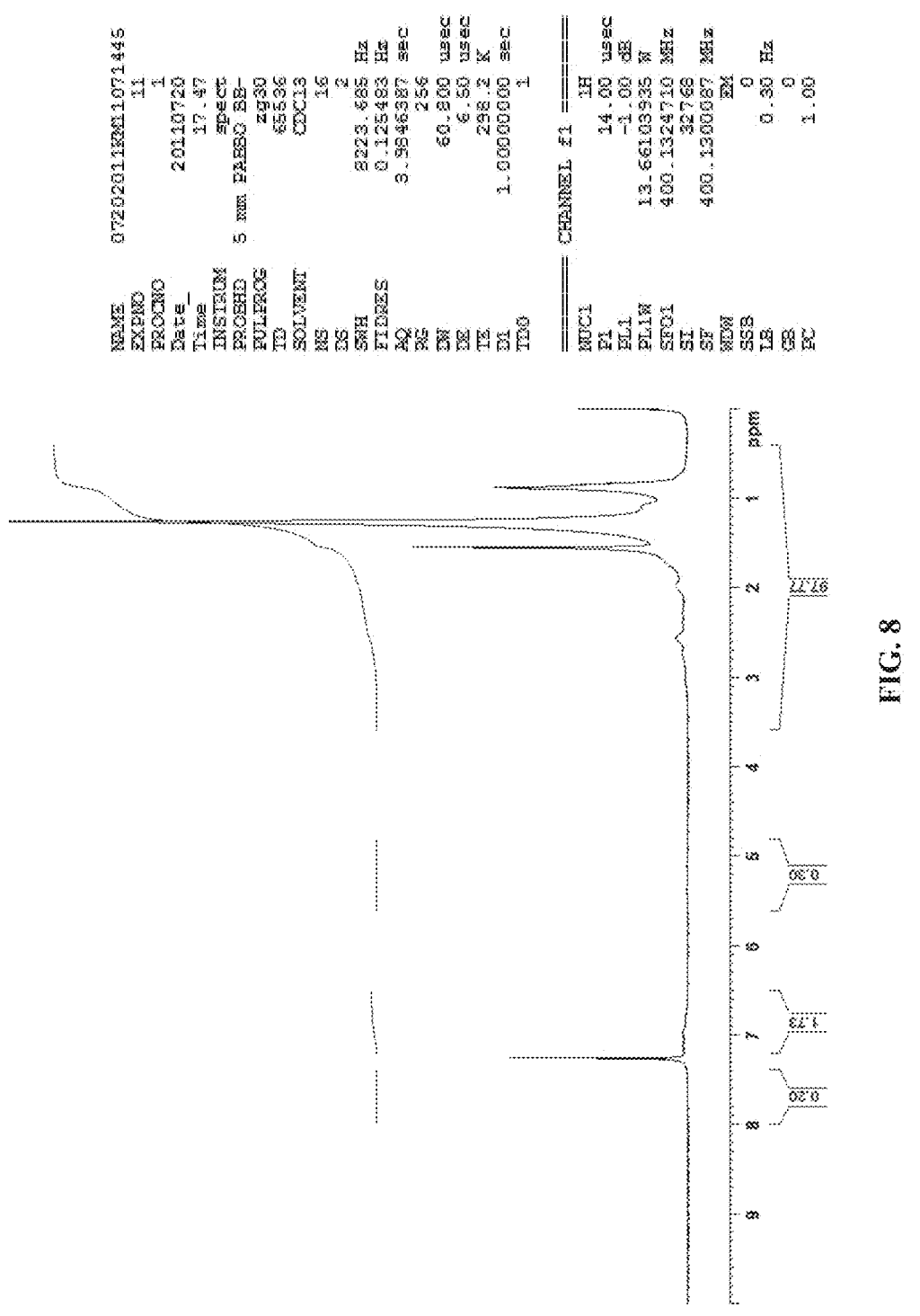
Figure 9:
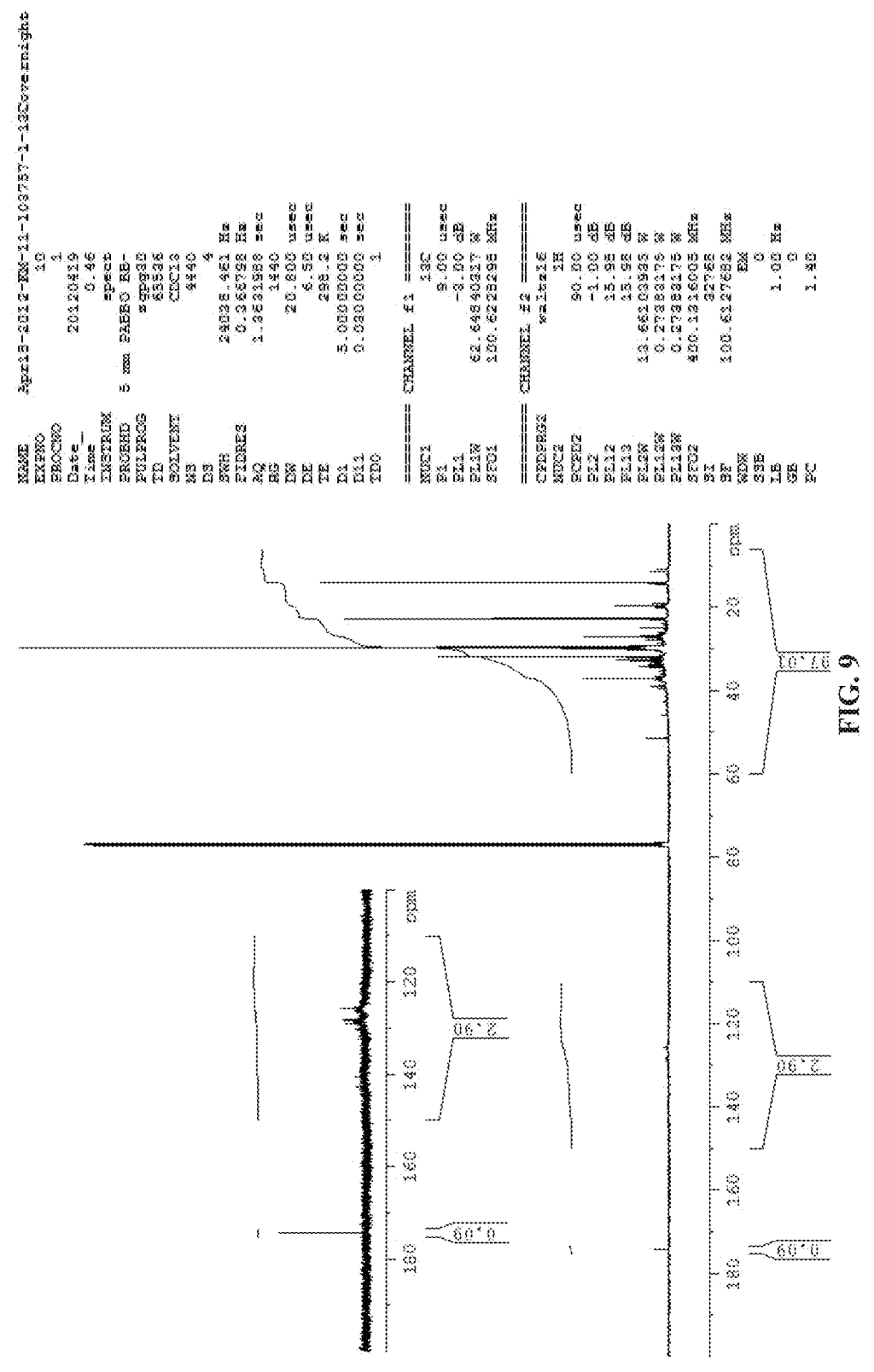

The lube product was also analyzed by IR and NMR. No carbonyl peak (1600 to 1800 $cm^{-1}$ region) was observed from IR (FIG. 7), indicating the level of acid, ester, aldehyde, or ketone is below the detection limit. The product was characterized by both $^1$H NMR and $^{13}$C NMR. $^1$H NMR (FIG. 8) reveals the presence of trace amount of vinylic CH (δ=5.4 ppm). A small amount (1.7%) of aromatic CH (δ~7 ppm) is found in the product. $^{13}$C NMR (FIG. 9, labeled as 11-103757-1) reveals that 2.9% of the carbon atoms are in aromatic rings (chemical shift in the 120-150 ppm region).

Example 3

Direct Conversion of Rapeseed (Canola) Oil to Lubes in a Fixed-Bed Reactor Using MgO Stacked with Hydrogenation Catalyst In a fixed-bed reactor (⅜"OD) these catalysts were loaded: 2.0 g of hydrogenation catalysts (alumina bound ZSM-48, 0.6% Pt, 1/16"extrudate cut to L/D ~1), and 5.0 g MgO (commercial sample: MagChem 200AD, sized to 14-25 mesh) at the top. The two catalyst beds were separated by 0.5 cc of sand in between. The reactor was assembled and placed in a reactor furnace. The catalyst was pre-treated at 350° C. under flowing $H_2$ (100 cc/min) for 2 hours, then a liquid feed containing 20% rapeseed (canola oil) in dodecane was started at a flow rate of 2.0 cc/h and the $H_2$ flow was reduced to 40 cc/min at a pressure of 600 psig (4 mPag). After a 24 hour line-out period, the liquid product was collected and analyzed. GC shows complete conversion with ~60% selectivity to lube range molecules with the rest being diesel range fuel molecules.

Figure 10:
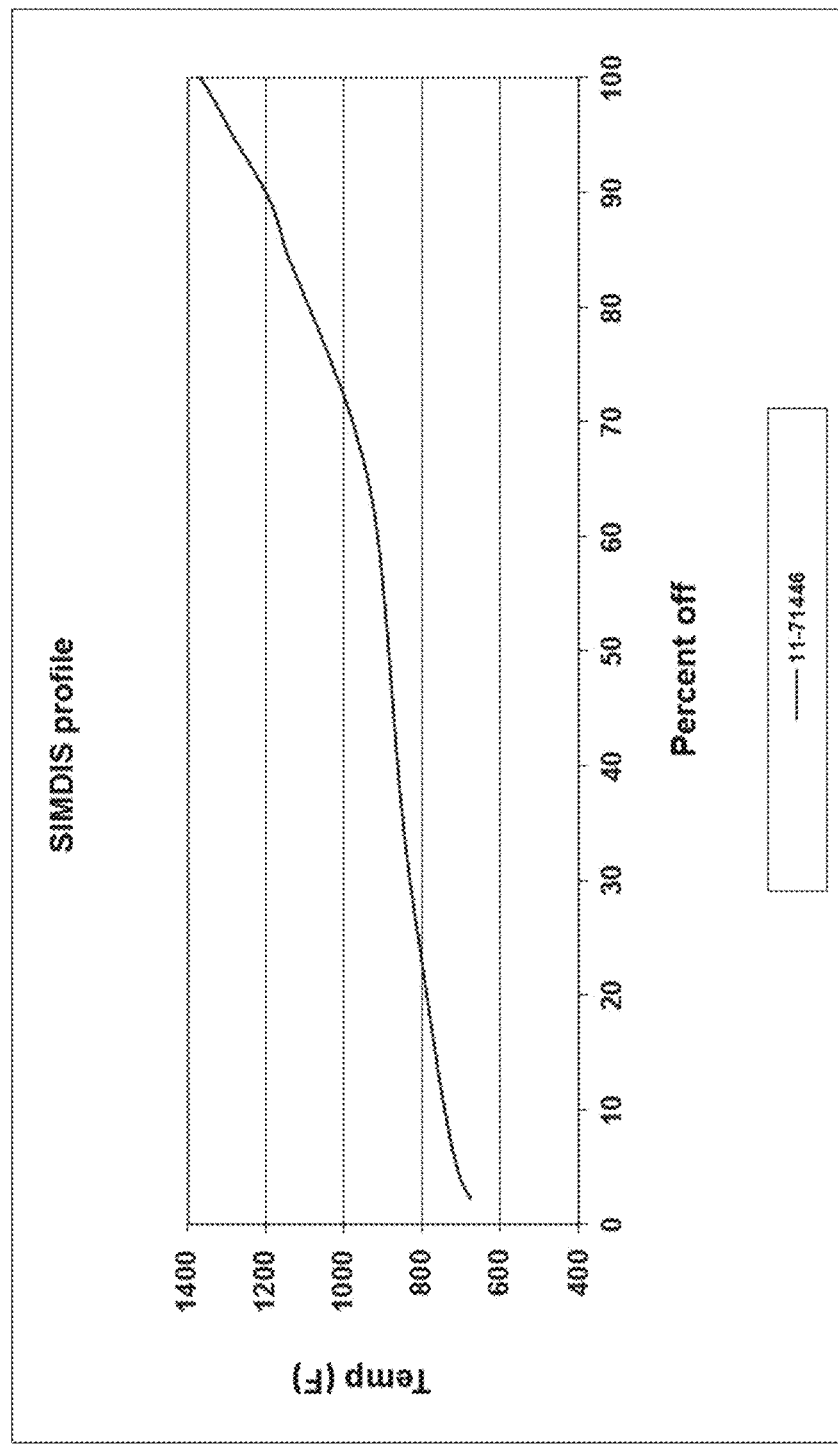
FIG. 10 is a simulated distillation profile of a lube base stock product derived from rapeseed oil over magnesium oxide and a hydrogenation catalyst stacked-bed (Example 3).

Although no issue was encountered during the first two days of operating the unit; the pressure started to build up after that and the unit was plugged in a week and the operation was halted. Without being bound to any theory, it is believed that the catalyst instability associated with the use of alumina-bound hydrogenation catalyst contributed. Approximately 65% of the liquid feed was recovered as liquid product. The product was subjected to Kugelrohr distillation (180° C., 1 Torr) to remove solvent dodecane and fuel range molecules. The bottom recovered from Kugelrohr distillation was the lube range product (labeled as 11-71446). Simulated distillation (SIMDIS) curve of the lube product is shown in FIG. 10.

The kinematic viscosity for the lube product was also measured. It has a KV40 of 31.51 cSt and KV100 of 6.24 cSt, giving a viscosity index (VI) of 153. The pour point of the sample is −24° C.

Figure 11:
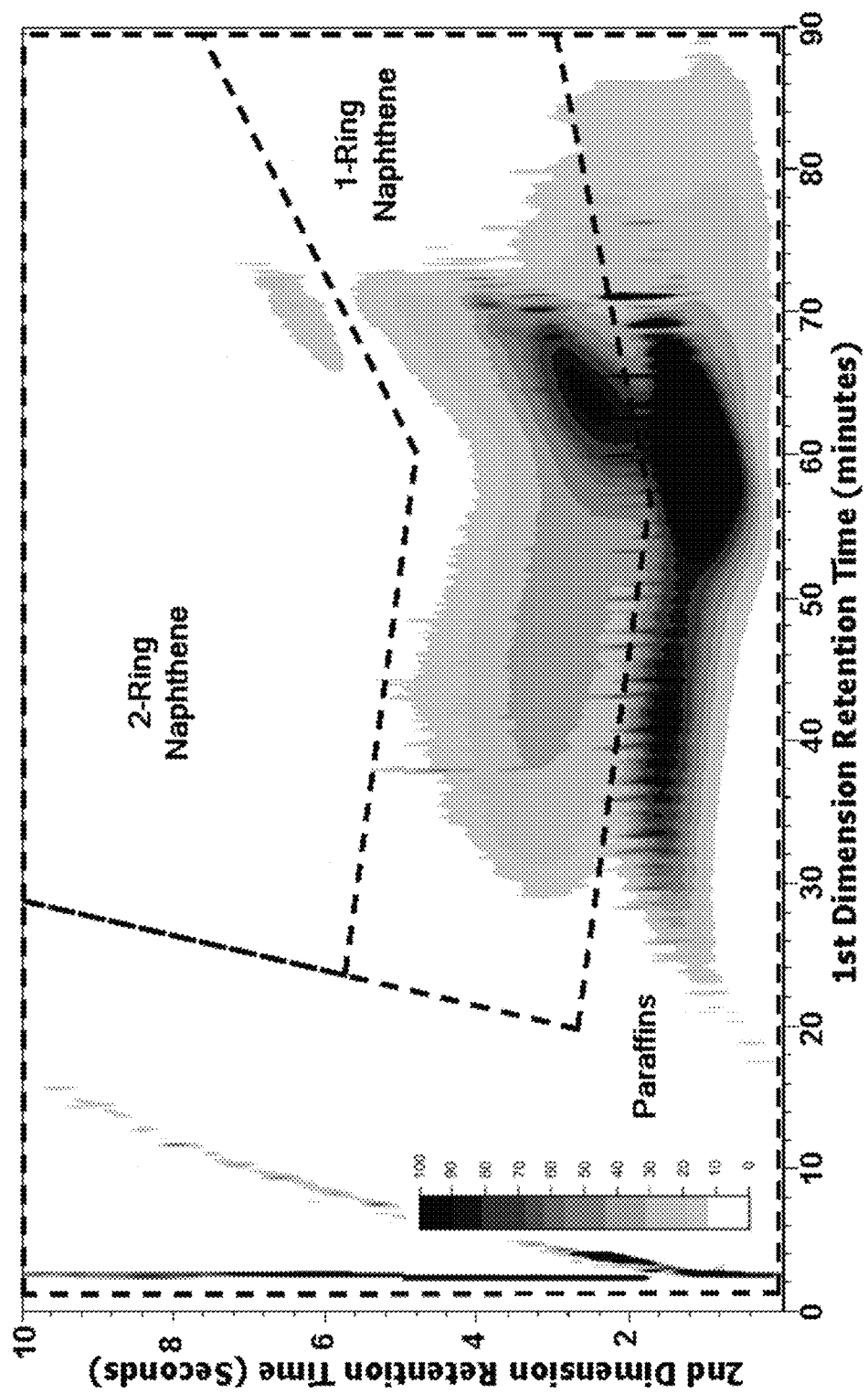
FIG. 11 is a two-dimensional gas chromatogram of a lube base stock product derived from rapeseed oil over magnesium oxide and a hydrogenation catalyst stacked-bed (Example 3).
Figure 12:
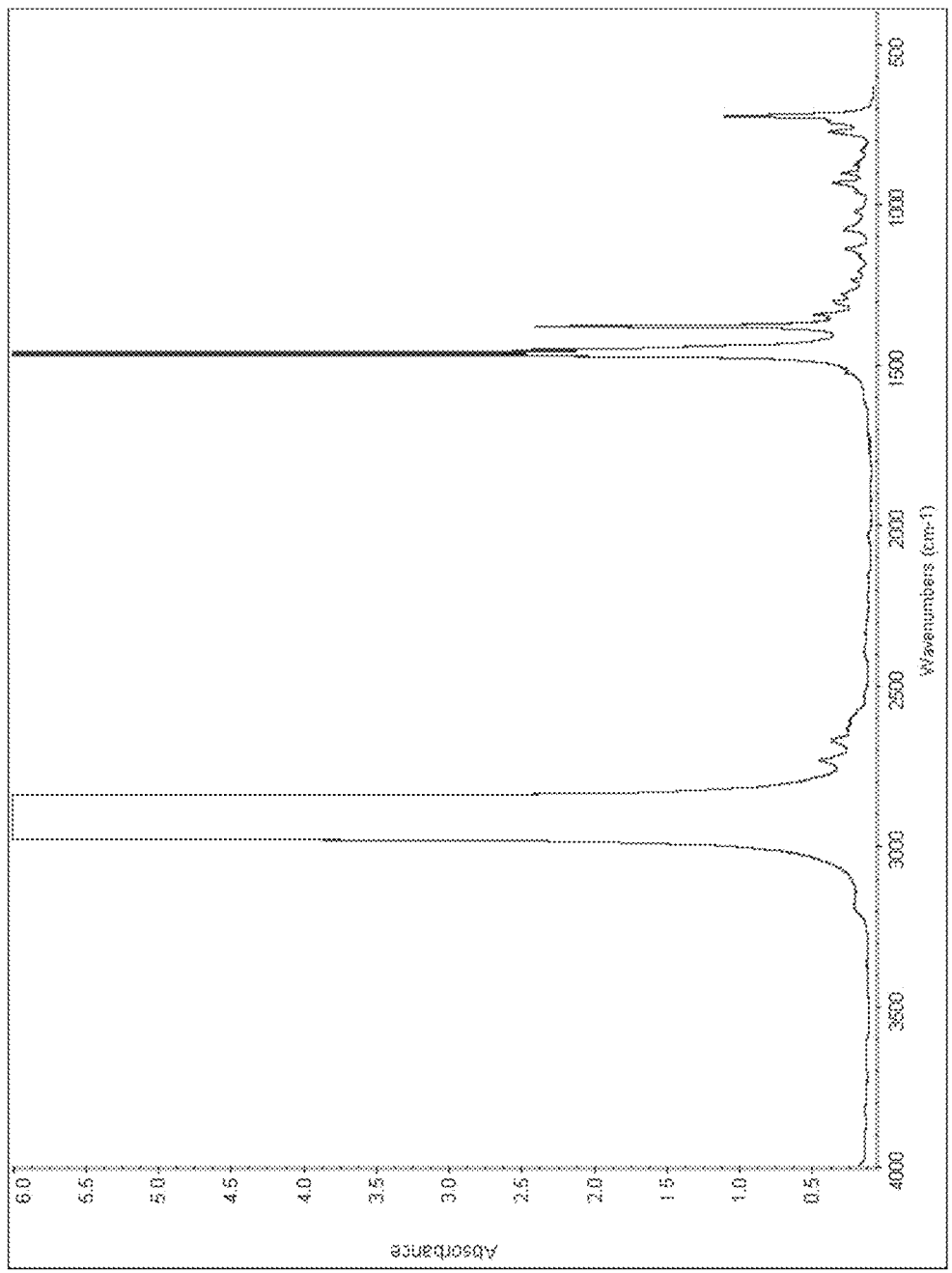
FIG. 12 is an infrared spectrum of a lube base stock product derived from rapeseed oil over magnesium oxide and a hydrogenation catalyst stacked-bed (Example 3).
Figure 13:
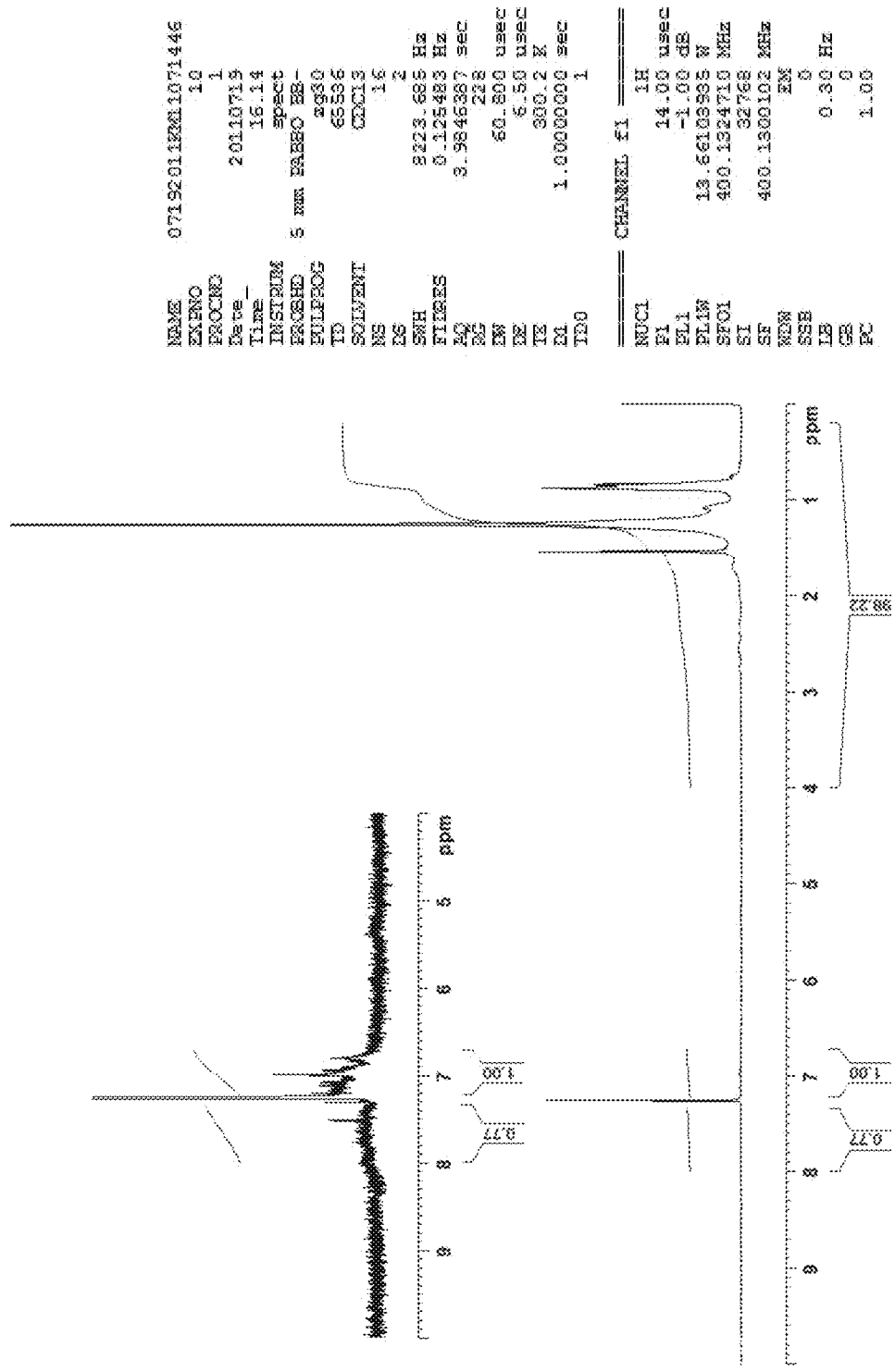
FIG. 13 is a $^1$H NMR spectrum of a lube base stock product derived from rapeseed oil over magnesium oxide and a hydrogenation catalyst stacked-bed (Example 3).
Figure 14:
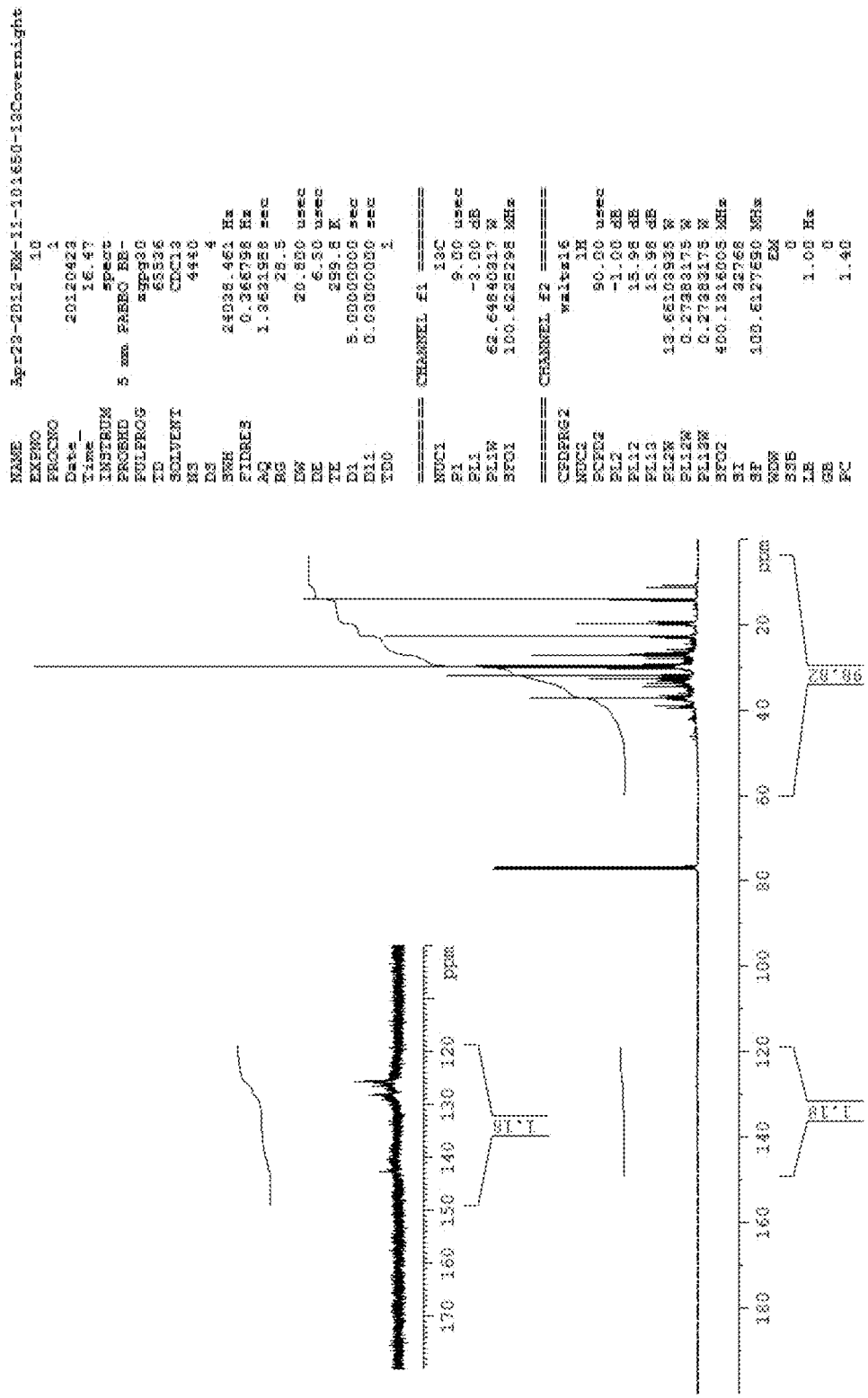
FIG. 14 is a $^{13}$C NMR spectrum of a lube base stock product derived from rapeseed oil over magnesium oxide and a hydrogenation catalyst stacked-bed (Example 3).

2D-GC results for the lube product are shown in FIG. 11, which reveals it contains 52% (wt.) iso-paraffins, 42% 1-ring naphthenics, and 5% 2-ring naphthenics. The lube product was also analyzed by IR and NMR. No carbonyl peak (1600-1800 cm$^{-1}$ region) was observed from IR (FIG. 12), indicating the level of acid, ester, aldehyde, or ketone is below detection limit. The product was characterized by both $^1$H NMR and $^{13}$C NMR. $^1$H NMR (FIG. 13) reveals the product is free of vinylic CH (5.4 ppm). A small amount (1.77%) of aromatic CH (δ~7 ppm) is found in the product. $^{13}$C NMR (FIG. 14, labeled as 11-101650-0) reveals that 1.2% of the carbon atoms are in aromatic rings (chemical shift in the 120 to 150 ppm region).

All documents described herein are incorporated by reference herein, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. Likewise, the term "comprising" is considered synonymous with the term "including" for purposes of Australian law.

When numerical lower limits and numerical upper limits are listed herein, ranges from any lower limit to any upper limit are contemplated.

While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

What is claimed is:

1. A method for producing a lube basestock from a feedstock of biological origin, the method comprising:
    coupling the feedstock of biological origin in the presence of hydrogen with catalyst components comprising a first catalyst and a second catalyst to form at least a ketone and/or heavier oxygenate and hydrogenating the ketone and/or heavier oxygenate to form at least a hydrocarbon product, and wherein the hydrocarbon product is a lube basestock, wherein said coupling and said hydrogenating take place in a single reactor,
    wherein the first catalyst comprises a basic material comprising CeO$_2$, and mixtures thereof; and
    wherein the second catalyst comprises a hydrogenation catalyst and a hydrothermally stable binder, and wherein the feedstock of biological origin comprises one or more components selected from the group consisting of fatty acids, fatty acid esters, fatty alcohols, fatty olefins, mono-glycerides, di-glycerides, tri-glycerides, phospholipids, and saccharolipids.

2. The method according to claim 1, comprising providing the feedstock of biological origin as a solution in a hydrocarbon solvent.

3. The method according to claim 1, wherein the hydrothermally stable binder comprises TiO$_2$, ZrO$_2$ or CeO$_2$.

4. The method according to claim 1, further comprising hydroisomerizing the hydrocarbon product.

5. The method according to claim 1, comprising contacting the feedstock of biological origin sequentially with the first catalyst in a first zone of the reactor and with the hydrogenation catalyst in a second zone of the reactor.

6. The method according to claim 1, wherein the first catalyst has a ratio of CO$_2$ chemisorption per gram of basic material to NH$_3$ chemisorption per gram of basic material in the range of from 1 to 100.

7. The method according to claim 1, wherein the hydrogenation catalyst comprises a noble metal supported on a zeolite.

8. The method according to claim 1, wherein the hydrogenation catalyst comprises a metal hydrogenation component, the metal hydrogenation component comprising Ni, Co, Pd, Pt, Ru, Rh, Co—Mo, Ni—Mo, Ni—W, Co—W, or a combination thereof, the metal hydrogenation component being supported on an inorganic support comprising silica, alumina, titania, zirconia, a zeolite, or combinations thereof.

9. The method according to claim 1, wherein the hydrogenation catalyst comprises Pt supported on a zeolite.

10. The method according to claim 9, wherein the zeolite component of the hydrogenation catalyst comprises a one-dimensional zeolite selected from the group consisting of ZSM-22, ZSM-12, ZSM-23, ZSM-4, ZSM-48 and ZSM-50.

11. The method according to claim 1,
    wherein the hydrogenation catalyst is Pt supported on ZSM-48 or ZSM-48/NiWO$_x$,
    wherein the hydrothermally stable binder is TiO$_2$, ZrO$_2$ or a mixture thereof, and
    wherein the method is carried out at a temperature of from 300 to 400° C. under H$_2$ partial pressure of from 500 to 800 psig.

12. The method according to claim 1, wherein the first catalyst further comprises an acidic material.

13. The method according to claim 12, wherein the acidic material is selected from the group consisting of acidic clay, alumina, aluminosilicate, metalloaluminophosphate and a mixture thereof.

14. The method according to claim 12, wherein the acidic material is selected from the group consisting of acidic metal oxide, mixed metal oxide, WO$_3$/ZrO$_2$, MoO$_3$/ZrO$_2$, zeolite of the faujasite, beta, or MWW family, 10-ring zeolite, 8-ring zeolite, and metalloaluminophosphate comprising Si, Ti, Zr, Fe, Co, Ni, Cu, Zn, Y, La, Ce, Pr, Nd, Sm or Gd.

15. The method according to claim 12, wherein the second catalyst comprises Ni, Co, Pd, Pt, Ru, Rh, Co—Mo, Ni—Mo, Ni—W, Co—W, or a combination thereof supported on silica, alumina, titania, zirconia, a zeolite, or a combination thereof.

16. The method according to claim 15, wherein the second catalyst comprises a hydroisomerization catalyst comprising Pt supported on zeolite.

17. The method according to claim 12, wherein the acidic material comprises Montmorillonite, bentonite, WO$_x$/ZrO$_2$, or a combination thereof,
    wherein the hydrogenation catalyst comprises a) Ni, Pd, or a combination thereof supported on silica, carbon, or a combination thereof; b) Co—Mo, Co—W, or a combination thereof supported on gamma-alumina; or c) Ni—Mo, Ni—W, or a combination thereof supported on gamma-alumina, wherein the hydrothermally stable binder comprises $TiO_2$, $ZrO_2$ or a mixture thereof, and wherein the method is carried out at a temperature of from 250 to 350° C. under $H_2$ partial pressure of from 500 to 800 psig.

18. A method of making a lube basestock and/or a diesel fuel from a feedstock of biological origin in a single reactor, comprising
a) converting a feedstock of biological origin comprising a triglyceride to a fatty acid;
b) coupling the fatty acid to a ketone and/or a heavier oxygenate with a basic catalyst in the presence of hydrogen, wherein the basic catalyst is comprising $CeO_2$; and
c) hydrogenating the ketone and/or the heavier oxygenate to a hydrocarbon with a catalyst comprising a hydrogenation catalyst and a hydrothermally stable binder, and wherein the hydrogenation produces a hydrocarbon comprising a lube basestock, a diesel fuel or a combination thereof, wherein the feedstock of biological origin comprises one or more components selected from the group consisting of fatty acids, fatty acid esters, fatty alcohols, fatty olefins, mono-glycerides, di-glycerides, tri-glycerides, phospholipids and saccharolipids.

19. The method according to claim 18, further comprising d) hydroisomerizing the hydrocarbon produced by step c).

20. The method according to claim 18, wherein the hydrogenation catalyst comprises a metal hydrogenation component selected from the group consisting of Ni, Co, Pd, Pt, Ru, Rh, Co—Mo, Ni—Mo, Ni—W, and Co—W supported on a zeolite selected from the group consisting of ZSM-22, ZSM-12, ZSM-23, ZSM-4, ZSM-48 and ZSM-50.

21. A lube basestock prepared from a biologically derived oil comprising a fatty acid, a fatty acid ester, a fatty alcohol, a fatty olefin, a mono-glyceride, a di-glyceride, or a tri-glyceride, comprising by weight no more than 20% of 2-ring naphthenes, at least 20% of paraffins, and no more than 60% of 1-ring naphthenes, as determined by two-dimensional gas chromatography, wherein the lube basestock is prepared by a method comprising:

coupling the biologically derived oil in the presence of hydrogen with catalyst components comprising a first catalyst and a second catalyst to form at least a ketone and/or heavier oxygenate and hydrogenating the ketone and/or heavier oxygenate to form at least a hydrocarbon product, wherein the hydrocarbon product is the lube base stock, wherein the first catalyst comprises a basic material comprising $CeO_2$, and wherein the second catalyst comprises a hydrogenation catalyst and a hydrothermally stable binder.

22. The lube base stock according to claim 21, comprising greater than 30% by weight paraffins, no more than 10% by weight 2-ring naphthenes, and no more than 50% by weight 1-ring naphthenes.

23. The lube base stock according to claim 21, comprising greater than 50% by weight paraffins.

24. The lube basestock according to claim 21, where the lube basestock has greater than 25 carbon atoms.

25. The lube basestock according to claim 21, where the lube basestock has a pour point of less than −10° C.

26. The lube basestock according to claim 21, where the lube basestock has a viscosity index (VI) greater than 90.

27. The lube basestock according to claim 21, where the lube basestock has aromatic carbon content in the range of 0.1 to 10% by weight, as determined by $^{13}C$ NMR spectroscopy.

28. The lube basestock according to claim 27, wherein the lube basestock has aromatic carbon content in the range of 0.5 to 10% by weight, as determined by $^{13}C$ NMR spectroscopy.

* * * * *